(12) United States Patent
Montiel et al.

(10) Patent No.: US 8,357,759 B2
(45) Date of Patent: Jan. 22, 2013

(54) REACTIVE BLOCK COPOLYMERS

(75) Inventors: Alfonso González Montiel, Atizapán de Zaragoza (MX); Leticia Flores Santos, Metepec (MX); Enrique Saldívar Guerra, Saltillo (MX)

(73) Assignee: CID Centro de Investigación y Desarrollo Tecnológico S.A. de C.V., Lerma (MX)

( * ) Notice: Subject to any disclaimer, the term of this patent is extended or adjusted under 35 U.S.C. 154(b) by 958 days.

(21) Appl. No.: 11/508,407

(22) Filed: Aug. 23, 2006

(65) Prior Publication Data

US 2007/0049696 A1   Mar. 1, 2007

Related U.S. Application Data

(60) Provisional application No. 60/711,890, filed on Aug. 26, 2005.

(51) Int. Cl.
C08F 293/00 (2006.01)
C08F 2/38 (2006.01)

(52) U.S. Cl. ........ 525/299; 525/294; 525/298; 525/302; 525/303

(58) Field of Classification Search ........... 525/88, 525/191, 220, 221, 222, 223, 241, 244, 256, 525/259, 260, 285, 293, 294, 298, 299, 302, 525/303; 526/220, 147, 213, 217
See application file for complete search history.

(56) References Cited

U.S. PATENT DOCUMENTS

| | | | |
|---|---|---|---|
| 4,590,241 A | 5/1986 | Hohlfeld | |
| 5,274,034 A | 12/1993 | Morgan et al. | |
| 5,627,228 A | 5/1997 | Kobayashi | |
| 6,066,686 A | 5/2000 | Katayama et al. | |
| 6,127,465 A | 10/2000 | Nodera | |
| 6,353,065 B1 | 3/2002 | Charleux et al. | |
| 6,369,162 B1 | 4/2002 | Visger et al. | |
| 6,417,257 B1 | 7/2002 | Katayama et al. | |
| 6,417,274 B1 | 7/2002 | Braat et al. | |
| 6,451,901 B1 | 9/2002 | Maekawa et al. | |
| 6,531,547 B1 | 3/2003 | Visger et al. | |
| 6,566,468 B1 | 5/2003 | Fuso et al. | |
| 6,608,134 B1 | 8/2003 | Tobing et al. | |
| 6,765,062 B2 | 7/2004 | Chin et al. | |
| 6,897,272 B1 | 5/2005 | Brookhart et al. | |
| 7,005,490 B2 | 2/2006 | Mestach et al. | |
| 7,009,011 B1 | 3/2006 | Keoshkerian | |
| 7,045,581 B2 * | 5/2006 | Fleury ............................ 526/65 |
| 7,078,473 B2 | 7/2006 | Lacroix-Desmazes et al. | |
| 7,323,528 B2 | 1/2008 | Saldivar Guerra et al. | |
| 2004/0049043 A1 | 3/2004 | Fuso et al. | |
| 2004/0077788 A1 | 4/2004 | Saldivar Guerra et al. | |
| 2005/0004310 A1 | 1/2005 | Hong et al. | |

FOREIGN PATENT DOCUMENTS

| | | |
|---|---|---|
| EP | 1340794 A2 | 9/2003 |
| WO | WO-99/47575 A1 * | 9/1999 |
| WO | WO 2004/005361 A1 | 1/2004 |
| WO | WO-2005/103093 A2 * | 11/2005 |

OTHER PUBLICATIONS

Brandup, J. et al Polymer Handbook 4th Edition John Wiley & Sons, Inc. New York (1999) p. VII-68.*
Park, et al., Living Radical Copolymerization of Styrene/Maleic Anhydride, J. Polym. Sci., Part A Polym Chem, 38, 2239 (2000).

* cited by examiner

*Primary Examiner* — Irina S Zemel
*Assistant Examiner* — Jeffrey Lenihan
(74) *Attorney, Agent, or Firm* — Stephen S. Hodgson

(57) ABSTRACT

A process for making a block copolymer compatibilizer, comprising reacting an acrylic monomer that has functional groups with one or more vinyl monomers in the presence of a free radical initiator and a stable free radical to form a reaction product that includes residual unreacted acrylic monomer, and reacting one or more vinyl monomers with the reaction product to form a second block that incorporates the residual unreacted acrylic monomer. A blend composition comprising a first thermoplastic polymer, which has functional groups, a reactive block copolymer that has functional groups in two or more blocks, and a second thermoplastic polymer that is compatible with one block of the block copolymer, where the functional groups in the first thermoplastic react with the functional groups in the block copolymer.

2 Claims, 4 Drawing Sheets

TEM image of Blend 20.
Fig. 3
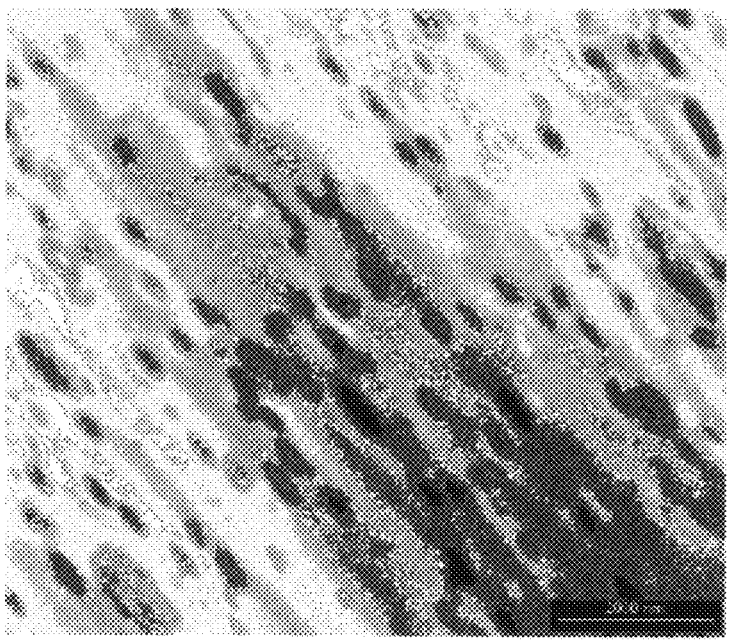
Fig. 4a
Fig. 4b
TEM images of Blend 24.
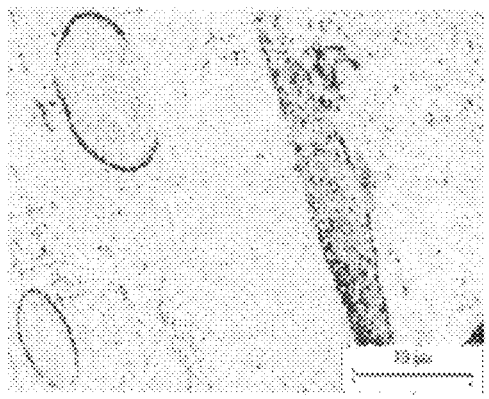
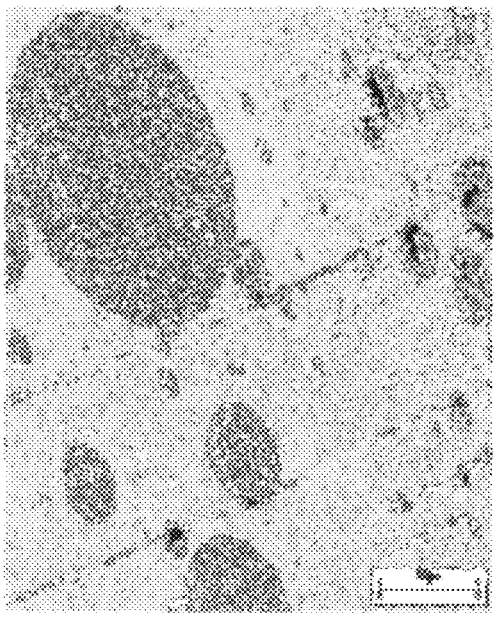

TEM image of Blend 29

Optical microscopy image of Blend 34

Optical microscopy Image of Blend 48
Fig. 7
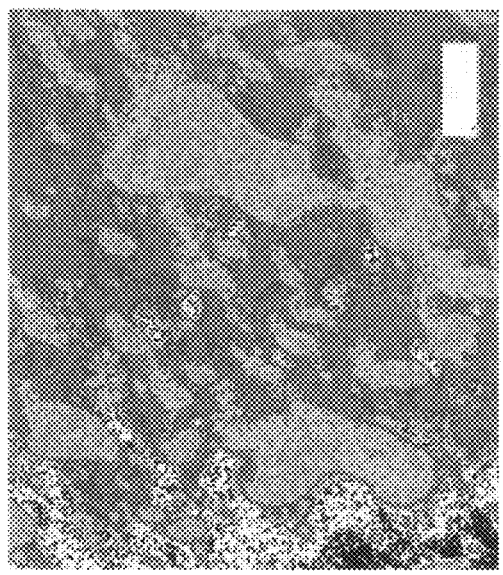
Optical microscopy and TEM Images of Blend 53
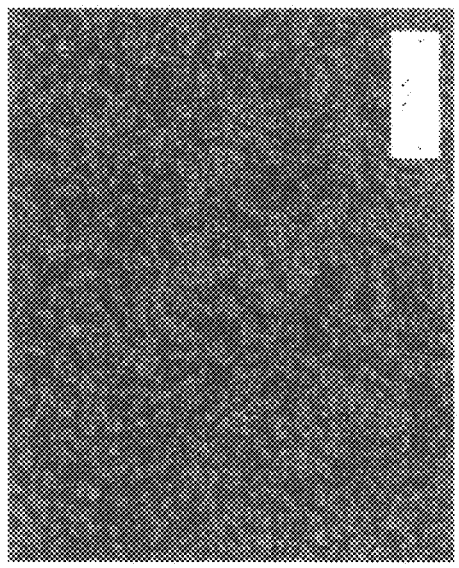
Fig. 8a      Fig. 8b

REACTIVE BLOCK COPOLYMERS

CROSS REFERENCE TO RELATED APPLICATION

Priority is claimed to U.S. Provisional Patent Application Ser. No. 60/711,890 filed by the inventors on Aug. 26, 2005, which is incorporated by reference.

BACKGROUND OF THE INVENTION

1. Field of the Invention

The present invention pertains to a process for making block copolymers containing a reactive functional group, such as anhydride, epoxy, amine, amide, hydroxyl or acid groups, in two or more blocks via free radical polymerization in the presence of a stable free radical, a composition of matter comprising block copolymers containing a reactive monomer or monomers in two or more blocks via free radical polymerization and use of the composition of matter as a compatibilizer in blending polymers.

2. Description of the Related Art

The blending of polymers provides a powerful route for obtaining materials with improved property/cost performances. Since most polymer pairs are immiscible, a compatibilization strategy is required to obtain maximum synergy of properties. This strategy is usually cheaper and less time-consuming than the development of new monomers and/or new polymerization routes, as the basis for entirely new polymeric materials. An additional advantage of polymer blends is that a wide range of material properties is within reach by merely changing the blend composition. Compatibilization of polymer blends can be achieved using compatibilizers, which are macromolecular species exhibiting interfacial activities in heterogeneous polymer blends. Usually the chains of a compatibilizer have a blocky structure, with one constitutive block miscible with one blend component and a second block miscible with the other blend component. Another option for compatibilization is the addition of a reactive polymer, miscible with one blend component and reactive towards functional groups attached to the second blend component, which results in an "in-situ" formation of block or grafted copolymers. This technique has certain advantages over the addition of pre-made block or grafted copolymers. Usually reactive polymers can be generated by free radical copolymerization or by melt grafting of reactive groups on to chemically inert polymer chains. Furthermore, reactive polymers only generate block or grafted copolymers at the site where they are needed, i.e. at the interface of an immiscible polymer blend.

The successful development of compatibilizers that permit composites of polyolefins such as polypropylene and minerals, glass and/or polar thermoplastics, having excellent physical properties was rapid. By the early 1970's compatibilizers based on maleated polypropylene were available for the manufacture of polyolefin-based composite materials. The maleic anhydride moieties of these compatibilizers is reacted with the nucleophilic amines and hydroxyl functional groups in polyamides, polyesters and polycarbonates and with the amino silanes used to modify the surface of glass fibers and other mineral fillers.

Attempts to apply the analogous solution to the other major hydrocarbon polymer group, styrenics, have been without success. Maleation of polystyrene is random along the polystyrene chain and is not located on the ends of the chain, as in the case for polypropylene. Similarly, copolymerization of styrene monomer and maleic anhydride yields an alternating copolymer, and copolymerization of styrene with other nucleophile reactive monomers is random along the polystyrene chain. Such candidate compatibilizers contain functional groups that are reactive with the nucleophiles present in the polar thermoplastics and amine modified fillers and therefore interact with the polar phase of the composites (e.g., glass, minerals, and or polar thermoplastic polymers), yielding in some cases more uniform dispersions of the one material in the other. However, because the architecture of these candidate compatibilizers is random, there are no separate domains, and therefore, no domain that is compatible with the styrene phase of the composite and sufficiently long to chain entangle with the polystyrene in the composite. As a result, even with improved dispersion of one phase in the other, the required improvement in the physical properties of the alloy material is not achieved, and, indeed, sometimes there is even a degradation of physical properties compared to the same alloy without the candidate compatibilizer (Dong, C., et. al., Polymer, 1996, 37, 14, 3055-3063; Chang, F., et al., Polym. Eng. Sci., 1991, 31, 21, 1509-1519; Jannasch, P., et. al., J. Appl. Polym. Sci., 1995, 58, 753-770).

The successful strategy with polyolefin composites and failure in polystyrene composites was studied and reported by Fumio Ide (Ide, F., et. al., J. Appl. Polym. Sci., 1974, 18, 4, 963-74). As mentioned in U.S. Pub. No. 2005/004310 A1, researchers recognized that the presence of reactive functional groups like maleic anhydride were necessary in compatibilizers, but not sufficient for good compatibilization. In addition to this, the placement of the nucleophile reactive functional groups within the compatibilizer polymer architecture has been random. Compatibilizer materials that present a block copolymer structure, in which each one of the blocks is thermodynamically compatible with one of two polymeric materials to be blended, perform more effectively as compatibilizers than their random copolymer counterparts (U.S. Pub. No. 2004/0077788A1). Well-defined styrene block copolymers containing reactive groups have been prepared and applied as reactive compatibilizers, but they usually exhibit important disadvantages, such as: i) complex synthetic techniques, ii) the presence of unstable and corrosive moieties and iii) the addition of an extraneous polymer with different chemical and physical properties (Park, C., et. al., Polymer, 2001, 42, 7465-7475; U.S. Pat. No. 6,417,274 B1; Koulouri, E. G., et. al., Macromolecules, 1999, 32, 6242-6248).

In order to obtain well defined block copolymers to be used as compatibilizers, several approaches have been taken, and one approach is the use of living polymerization processes. Living polymerization processes, in which termination reactions are suppressed or significantly reduced, allow for the formation of block copolymers, as the life of each individual chain is extended to periods comparable to the duration of the process (minutes or hours). It is possible to produce block copolymers with functional groups by anionic polymerization, but this technique presents severe limitations for its broad practical application. On one hand, it requires conditions of extreme purity in the monomers because humidity traces destroy the catalyst, and for many monomers it is very difficult to control, requiring extremely low temperatures. Also, the polymerization of monomers having functional groups is not practical since the catalyst can be destroyed by the presence of a number of functional groups. As a result, the industrial application of this technique is reduced to a few monomers, leaving out technologically-important functional monomers.

Due to limitations in the anionic polymerization process, a more promising technique for producing block copolymers with a large variety of monomers is that based on living or quasi-living free radical polymerization. This can be achieved by adding, to an otherwise standard free radical polymerization recipe, a chemical agent that significantly reduces the extent of irreversible termination or chain transfer reactions, conferring a living or quasi-living character to the polymerization, which is also called "controlled polymerization" or "controlled free radical polymerization." There are several ways to obtain this behavior (Sawamoto, et. al., Chem. Rev. 2001, 101, 3689-3745), but most of them are limited in an industrial practice because they require chemical agents that are not readily commercially-available in the market. Among these techniques, one that is particularly useful, and for which the required chemical agents are available in the market, is a quasi-living free radical polymerization controlled by nitroxides (nitroxide mediated radical polymerization, NMRP), and derivatives thereof (like alcoxyamines, U.S. Pat. No. 6,455,706 B2, which act as stable free radicals capping polymeric growing radicals and uncapping them in a fast and reversible way, allowing for short periods of propagation through monomer-addition steps (U.S. Pat. No. 5,401,804; EP 0 869 137 A1; U.S. Pat. Nos. 6,258,911 B1; 6,262,206 and 6,255,448 B1).

Nitroxide mediated radical polymerization or NMRP has been used to prepare diblock copolymers as additives for preparing lubricating oil compositions as reported by Visger et. al. (U.S. Pat. No. 6,531,547 B1), and recently, it has been used as a technique to obtain pure diblock copolymers that are able to act as compatibilizers in polymer blends. U.S. Patent Application Pub. No. 2005/0004310, filed by Hong et al., discloses the compatibilization of a styrenic polymer/polyamides or styrenic polymer/glass, using diblocks of styrene and a styrenic reactive block. The reported technique involves the purification of the first synthesized block (diluting with THF, adding methanol or water/methanol and drying) before adding the second monomer in order to have a pure polystyrene block. A variation of this approach that has been successfully applied in polyphenylene ether-polyamide blends (U.S. Pat. No. 6,765,062 B2) is the synthesis of end-functionalized polymers using a functional alcoxyamine (U.S. Pat. No. 6,566,468 B1; U.S. Pub. No. 2004/0049043A1). This approach requires a special controlling agent bearing epoxy functionality, which is not believed to be commercially available, and is more expensive than simple controlling agents such as TEMPO (2,2,6,6-tetramethyl-1-piperidinyloxy) or TEMPO derivatives. Another approach to the synthesis of pure block copolymers is taking advantage of the natural alternate polymerization of certain monomers like maleic anhydride and styrene in the presence of a nitroxide in order to control molecular weight and polydispersity, as described in the present assignee's U.S. Patent Application Pub. No. 2004/0077788A1, entitled Block Copolymers Containing Functional Groups, which is incorporated by reference.

Successful reactive compatibilizers described in the prior art are nonrandom block polymers, based on copolymers consisting of one reactive block and one nonreactive block or in special cases, only one reactive monomer at the polymeric chain end. However, in order to obtain pure blocks, an intermediate purification step is required, such as solvent evaporation, precipitation and evaporation, and the purification step increases the cost of the process. Only in the case where the monomers naturally create an alternating composition, such as in the case of styrene and maleic anhydride, are blocks formed as a consequence of reactivity, where a purification step is not required. Consequently, there remains a need for improvements in the field of compatibilizers.

SUMMARY OF THE INVENTION

The present invention provides a process for making a block copolymer having a first block with functional groups provided via an acrylic monomer, where no purification step is used after polymerizing the first block so that an amount of unreacted residual monomer, which has functional groups, is intentionally left in the reaction product from the first step. A second block is added to the first block to form the block copolymer. The second block is preferably polymerized from at least one vinyl monomer and the residual unreacted monomer that has functional groups. Functional groups are consequently added into the second block, as well as into the first block, which was discovered to provide a block copolymer that has a good performance as a compatibilizer.

In one embodiment, the present invention provides a process for making a block copolymer, which includes the steps of reacting an acrylic monomer, which has functional groups, and one or more vinyl monomers in the presence of a free radical initiator and a stable free radical to form a reaction product, where the reaction product includes residual unreacted acrylic monomer, and reacting one or more vinyl monomers with the reaction product to form a second block, where the second block incorporates the residual unreacted acrylic monomer.

In one embodiment, the present invention provides a block copolymer that has a composition that includes a first block, which comprises monomeric units of a functionalized acrylic monomer and monomeric units of a vinyl monomer, and a second block, which comprises monomeric units of one or more vinyl monomers and monomeric units of the functionalized acrylic monomer from the first block. In a preferred embodiment, the block copolymer is adapted for use as a compatibilizer for blends of materials, particularly for blends of thermoplastic polymers.

In contrast with block copolymer compatibilizers described in the prior art, the present inventors discovered unexpectedly that impure block copolymers according to the present invention (where at least one type of reactive acrylic monomer is present in the first and in the second block, since monomers remaining from the first block synthesis are not removed and are thus incorporated into the second block) can efficiently work as reactive compatibilizers of thermoplastic polymer blends. In one embodiment, the present invention provides the following blend composition, which is typical of blend compositions for which the inventive copolymers work as compatibilizers.

A typical inventive blend composition comprises from about 1 to about 98 wt % of a first thermoplastic polymer, which has functional groups selected from the group consisting of amino, amide, imide, carboxyl, carbonyl, carbonate ester, anhydride, epoxy, sulfo, sulfonyl, sulfinyl, sulfhydryl, cyano and hydroxyl, from about 0.01 to about 25 wt % of a block copolymer that includes a first block, which has monomeric units of a functionalized acrylic monomer and monomeric units of a vinyl monomer and a second block, which has monomeric units of one or more vinyl monomers and monomeric units of the functionalized acrylic monomer in the first block, and from about 1 to about 98 wt % of a second thermoplastic polymer, which is miscible with or compatible with the second block of the block copolymer, and where the acrylic monomer has functional groups that should react with the functional groups in the first thermoplastic polymer.

BRIEF DESCRIPTION OF THE DRAWINGS

A better understanding of the invention can be obtained when the detailed description of exemplary embodiments set forth below is considered in conjunction with the attached drawings, which are described as follows.

FIG. 3 is a photomicrograph of a blend composition according to the present invention.

FIGS. 4a and 4b are photomicrographs of a prior art blend composition.

FIG. 7 is a photomicrograph of a prior art blend composition.

FIGS. 8a and 8b are photomicrographs of a blend composition according to the present invention.

DETAILED DESCRIPTION OF THE EXEMPLARY EMBODIMENTS

Figure 1:
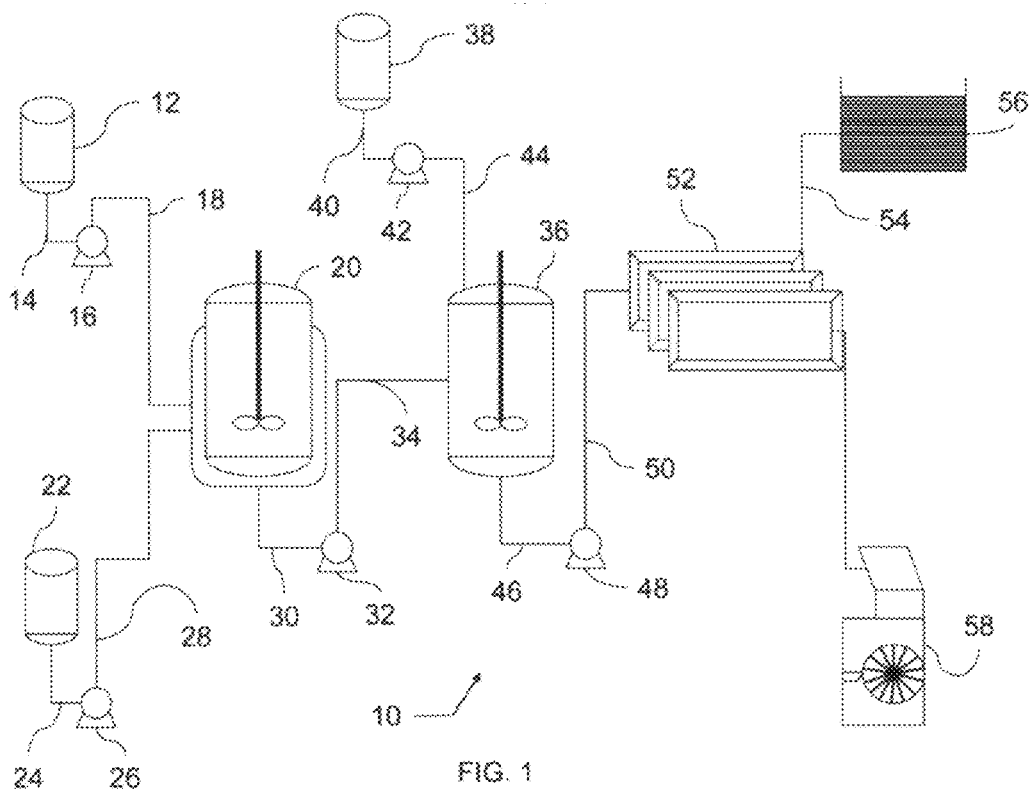
FIG. 1 is a process schematic of a batch process according to the present invention.

The present invention provides a process, a block copolymer made by the process, in which the composition, microstructure and molecular weight of the copolymer are carefully controlled, and applications for the block copolymer as a compatibilizer. The term microstructure refers to a detailed sequence or arrangement of units of each of the monomers in an average or typical copolymer chain. The term composition refers to the overall average relative amount of monomers in copolymer chains, which can be expressed in a molar or weight basis. In particular, one embodiment of the invention comprises block copolymers having a first block of a random copolymer with a total length between 1 and 720 monomeric units and a second block that incorporates residual monomers left over from the polymerizing the first block and one or more additional monomers, where the second block has a length between 100 and 2000 monomeric units.

A block copolymer can be made according to the present invention using a two-step process comprising: (1) reacting an acrylic monomer having functional groups and one or more vinyl monomers in the presence of a free radical initiator and a stable free radical to form a reaction product, wherein the reaction product includes residual unreacted acrylic monomer, and (2) reacting one or more vinyl monomers with the reaction product from step one to form a second block, wherein the second block incorporates the residual unreacted acrylic monomer. Monomers are polymerized using a stable free radical and a traditional free radical initiator or an alcoxyamine, and in a second step, monomers and optionally more initiator are added. Solvents can be used optionally in either or both steps.

The reaction product from the first step includes a first block that is a copolymer of the acrylic monomer and the one or more vinyl monomers and an amount of the acrylic monomer that was not polymerized. In the second step, one or more vinyl monomers copolymerize with the acrylic monomer left over from the first step to add to the first block and form the second block of the block copolymer. An initial portion of the second block may tend to have a higher proportion of the acrylic monomer because the acrylic monomer may become depleted before a final portion of the second block is formed by polymerization of the one or more vinyl monomers in the near absence of acrylic monomer.

The block copolymer of the present invention has a number of applications, one of which is as a compatibilizer for making blends of different materials, such as two different thermoplastics or of a thermoplastic and a glass or clay, that are otherwise relatively immisicible. Such compatibilizers used in the past for blending were often a block copolymer having a first block compatible with a first material and a second block compatible with a second material, where the first and second blocks were each essentially pure. The present inventors discovered unexpectedly that a block copolymer having a relatively impure second block, where the second block includes monomer used in the first block, performs well.

Chemical Synthesis of Block Copolymers

In a first step, an acrylic monomer that has functional groups is copolymerized in a reactor with at least one vinyl monomer using a free radical initiator and a stable free radical, which forms a first block in the reactor. The reaction is conducted so as to leave an amount of residual unreacted acrylic monomer after the completion of the first step so that the first block is mixed in with the residual unreacted acrylic monomer. A solvent can be used in the first step when it is deemed necessary. In either the same reactor or in a different reactor, at least one vinyl monomer is reacted with the first block and the residual unreacted acrylic monomer to add a second block to the first block to form a block copolymer having at least first and second blocks. The first block typically contains more functional groups from the acrylic monomer than the second block, but the second block has some functional groups because the residual unreacted acrylic monomer from the first step was added into the polymer chain of the second block.

The reaction product from the first step includes a copolymer of the acrylic monomer and the one or more vinyl monomers, which comprises the first block of the functionalized block copolymer, and a variable amount of unreacted monomers, including the acrylic monomer that was not polymerized. The amount of functional acrylic monomer incorporated in the first block and contained in the residual monomers can be calculated using commercially-available software such as POLYRED (an open-ended package for the computer-aided analysis and design of polymerization systems under development at the University of Wisconsin Polymerization Reaction Engineering Laboratory). In general, the composition of the copolymer comprising the first block will depend on the initial composition, the final conversion and the reactivity ratios (for a definition of reactivity ratios and values for a variety of monomer pairs see J. Brandrup, E. H. Immergut, E. A. Grulke. Polymer Handbook, fourth edition, John Wiley and Sons, Inc. II/181). The amount of functional acrylic monomer in the residual monomers can be experimentally determined by common analytical techniques such as: Gas chromatography, Nuclear magnetic resonance (NMR) or any technique that allows the quantification of a monomer in a mixture of monomers. If solvent is used during the first step, the amount of solvent should be taken into account to correct the determined weight percent (% wt.) of a particular monomer in the remaining mixture of unreacted monomers. If the technique can quantify all the species contained in the reaction product from the first step (NMR, for example), then it can quantify the amount of functional acrylic monomer in the residual monomers (molecules of functional acrylic monomer*100/(total amount monomer molecules) and the amount of functional acrylic monomer incorporated in the polymer (molecules of functional acrylic monomer in the polymer*100/(total amount monomer molecules in the polymer).

The residual monomers from the first block contain at least 1% w/w of the functionalized acrylic monomer, but more preferably in the range of 5-95% w/w, and most preferably in the range of 5-85% w/w. In the second step, one or more vinyl monomers copolymerize with the acrylic monomer and other monomers left over from the first step to add to the first block and form the second block of the block copolymer. The amount of functional acrylic monomer in the second block will depend on the concentration of the residual functional acrylic monomer in the residual monomers from the first block, on the first block conversion and on the amount of monomers added in the second step. The composition of the second block at different conversions can also be calculated using commercially-available software such as POLYRED, including in the calculation the three or more monomers that are involved in the polymerization of the second block. Preferred concentration of the functionalized acrylic monomer in the block copolymer ranges between about 0.5 and about 70 weight percent but more preferably in the range of 0.5 and about 50% w/w. The total amount of functional acrylic monomer incorporated in the block copolymer can be quantified using techniques such as NMR.

The synthesis of block copolymers by a procedure in which the first block is not purified or has not converted to 100% was addressed in 1994 by Georges et. al. (U.S. Pat. No. 5,401,804). More recently Visger, et. al (U.S. Pat. No. 6,531,547B1) and Po, et. al (WO 2004/005361A1) disclosed the synthesis of block copolymers using a processes that comprises polymerizing at least one vinylaromatic monomer until a certain conversion is obtained (5-95 mole % in the case of Visger and 5-99% in the case of Po) and then adding a monomer deriving from methacrylic acid (Po) or an acrylic monomer and optionally additional vinyl aromatic monomers (Visger). Po discusses the advantage of not isolating the first block in terms of eliminating the onerous precipitation and recovery phase of the first polymeric block. In contrast with the prior art, in the present invention a functional acrylic monomer is polymerized in the first block (in contrast to a vinyl aromatic monomer), in order to incorporate reactive groups (epoxy, acid, anhydride, amine, amide and hydroxyl groups) that are required in different applications described below (for example, reacting with a functional thermoplastic polymer in polymeric blends). In contrast with the prior art, in the present invention, the conversion of monomers in the first block and the amount of initial functional acrylic monomer are calculated in order to assure the presence of residual functional acrylic monomer that will be incorporated in subsequent blocks, and not merely as means of facilitating the next polymerization step, avoiding a purification step. In the present invention, we have unexpectedly found that the presence of reactive groups in the second block is useful for the application of these block copolymers as compatibilizers for different blends and composites. The presence of the functional acrylic monomer in subsequent blocks has at least two advantages.

One advantage is that the acrylic monomer modifies the polarity of subsequent blocks in order to match the polarity of one of the polymer blend components. The advantage of using functional acrylic monomers is that, in general, they are more polar than monomers such as vinyl aromatic monomers, and the presence of a controlled amount of functional acrylic monomers in the second and/or subsequent blocks can raise the polarity improving their miscibility with different materials such as thermoplastic polymers.

Another advantage is that in the case of applications such as blend compatibilizers, previous investigators had proven the superior performance of pure diblock copolymers over random copolymers. Thus, the need of a purification step for the first block is a requisite to obtain good results (Stott, P., U.S. Pub. No. 2005/004310A1), unless the monomers used in the synthesis of the first block formed structures such as an alternating block, eliminating the need of a purification step (Saldivar, et. al., U.S. Pub. No. 2004/0077788A1). In contrast, in the present work the present inventors unexpectedly found that diblock copolymers, which were not purified after the first block was synthesized, and which include functional reactive groups in both the first and the second or subsequent blocks, perform well as compatibilizers. The present inventors believe that one of the possible explanations to this behavior is that the second block (miscible with a non functional thermoplastic polymer), containing reactive functional groups (incorporated from the unreacted monomers of the first step), is able to attach to the reactive thermoplastic polymer at different points, as illustrated in Illustration 1 below, improving the interface contact between a non-reactive and a reactive thermoplastic polymer. (See for example, a comparison between the behavior of a diblock vs. a triblock, and the stable structure formed by a triblock in Chin-An, et. al., Macromolecules, 1997, 30, 549-560.) In the case of random copolymers this advantage is usually not obtained since the functional groups are distributed randomly along the chain, and the number of monomeric units of vinyl monomers miscible with the thermoplastic polymer is probably not large enough to form entanglements with the thermoplastic monomer, and although it is strongly attached to the functional thermoplastic polymer, its interaction with the thermoplastic polymer is not good enough.

Illustration 1.

| The compatibilizer diblock copolymer crosses the boundary of the two thermoplastics once. It "joins" both thermoplastics by one C—C bond | The compatibilizer triblock copolymer crosses the boundary of the two thermoplastics twice. It "joins" both thermoplastics by two C—C bond | The compatibilizer block copolymer of the present invention crosses the boundary of the two thermoplastics more than two times, "joining" both thermoplastics by more than two C—C bonds |
|---|---|---|
| Thermoplastic polymer | | |
|  | 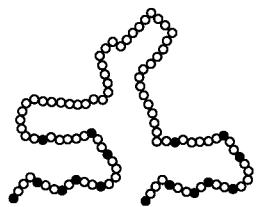 |  |
| Functional thermoplastic polymer Pure diblock containing reactive functional acrylic monomer just in one block | Pure triblock copolymer containing reactive functional acrylic monomer in the first and third block | Block copolymer containing reactive functional acrylic monomer in both blocks | o o Vinyl monomer
● Functional acrylic monomer

In the three cases it's considered that the number of vinyl monomeric units compatible or miscible with the thermoplastic polymer is enough to entangle with the thermoplastic polymer (above the entanglement polymerization index)

Illustration 1 is a schematic representation of the structure of a pure diblock, a pure triblock and a block copolymer containing reactive functional acrylic monomer in both blocks according to the present invention.

A preferred stable free radical for use in the inventive process contains the group .O—N< and is selected from the family of nitroxy radical compounds. Typical examples of nitroxy radical compounds include, but are not limited to,

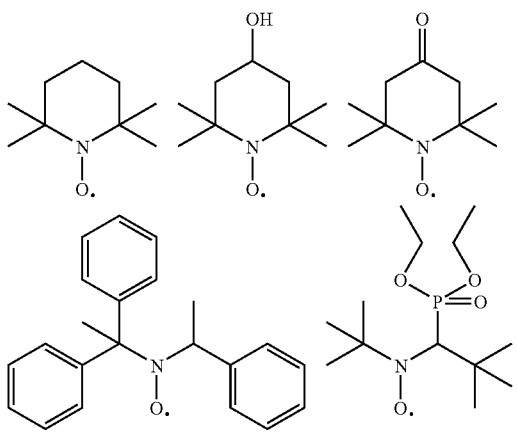

Other compounds in the family include those mentioned in the U.S. Pat. No. 4,521,429, issued to Solomon et al., WO2004014926 (A3), issued to Couturier, Jean Luc, et. al., US2003125489, issued to Nesvadba Peter, et. al., US2001039315, issued to Nesvadba Peter, et. al. In cases where larger amounts of methacrylic monomer are polymerized, nitroxides, such as tert-butyl 1-diethylphosphono-2,2-dimethylpropyl nitroxide, tert-butyl 1-phenyl-2-methylpropyl nitroxide, are preferred.

Preferred free radical initiators for use in the inventive process include peroxide and azo compounds. Typical examples include, but are not limited to, 2,2'-Azobis(2-Methylpropanenitrile), 2,2'-Azobis(2-Methylbutanenitrile), dibenzoyl peroxide (BPO), tert-Amyl peroxy-2-ethylhexanoate, tert-Butyl peroxy-2-ethylhexanoate, 2,5-Bis(2-ethylhexanoylperoxy)-2,5-dimethylhexane and tert-Butyl peroxydiethylacetate.

Although the nitroxide mediated radical polymerization method is specifically mentioned herein to prepare the compatibilizers of the present invention, those skilled in the art will recognize that any of the other well-known, so called "living", "pseudo-living" or "controlled" radical polymerization methods can be used in the present invention. Such stable free radical polymerization methods include the presence of species which reversibly terminate chains by: i) reversible homolytic cleavage of covalent species, ii) reversible formation of persistent hypervalent radicals and iii) degenerative transfer. (Moad, G.; Solomon, D., *The Chemistry of Radical Polymerization*. $2^{nd}$ edition. Elsevier, UK, 2006, chapter 9; *Controlled Radical Polymerization*, Matyjaszewski, K., editor, American Chemical Society, Washington, D.C., 1997, Chapter 1; Sawamoto, et. al., Chem. Rev. 2001, 101, p3691). These methods include, but are not limited to, iniferters, organosulfur iniferters, Reversible Addition-Fragmentation Transfer (RAFT) reactions, sulfur-centered radical-mediated polymerization, Atom Transfer Radical Polymerization (ATRP), reverse atom transfer radical polymerization (reverse-ATRP), metal complex-mediated radical polymerization, oxygen-centered radical-mediated polymerization, nitrogen-centered radical-mediated polymerization, iodine-transfer polymerization, telluride-mediated polymerization, stibine-mediated polymerization. Any one of these methods for providing a stable free radical polymerization can be used according to the present invention.

In the present invention one of the monomers is an acrylic monomer having functional groups which is added during the first step. Acrylic monomers contain vinyl groups, that is, two carbon atoms double bonded to each other, directly attached to the carbonyl carbon (C=C—CO—). The functional groups contained in the acrylic monomers include, but are not limited to, epoxy, acid, anhydride, amine, amide and hydroxyl groups. Preferred acrylic monomers that have functional groups include: glycidyl methacrylate, acrylic acid, methacrylic acid, 2-hydroxyethyl methacrylate, maleic anhydride, 2-dimethylaminoethyl methacrylate and 2-diethylaminoethyl methacrylate.

In the present invention one or more vinyl monomers are added in the first step and in the second step of the polymerization process. A vinyl monomer is a compound that has a vinyl group C=C—. Examples of vinyl monomers are styrene, substituted styrenes, ethylene, isoprene, isobutylene, butadiene, acrylates, methacrylates, substituted acrylates, substituted methacrylates, acrylonitrile, N-phenyl maleimide, N-cyclohexyl maleimide, maleic anhydride. Preferred vinyl monomers in the first step include styrene, substituted styrenes, acrylates, methacrylates, substituted acrylates and substituted methacrylates. Preferred vinyl monomers in the second step include styrene, substituted styrenes, acrylonitrile, N-aromatic substituted maleimides, N-alkyl substituted maleimides, maleic anhydride, acrylic acid, methyl methacrylate, alkyl substituted acrylates, aryl substituted acrylates, alkyl substituted methacrylates, aryl substituted methacrylates and 2-hydroxyethyl methacrylate.

In one embodiment, the functional acrylic monomer is selected from the group consisting of glycidyl methacrylate, maleic anhydride, 2-hydroxyethyl methacrylate, acrylic acid and 2-diethylaminoethyl methacrylate and the vinyl monomer used in the first step is styrene. In one embodiment, the vinyl monomers in the second step can be selected from, but not restricted to, the group consisting of styrene, N-phenyl maleimide, methyl methacrylate and butyl methacrylate.

In a preferred embodiment, the functional acrylic monomer is glycidyl methacrylate.

In a preferred embodiment, styrene is used as the vinyl monomer in the second step.

In a specific embodiment, the vinyl monomer in the second step includes N-aromatic substituted maleimides or N-alkyl substituted maleimides.

In a specific embodiment, the vinyl monomer in the second step is selected from the group consisting of styrene, substituted styrenes, acrylonitrile, N-aromatic substituted maleimides, N-alkyl substituted maleimides, maleic anhydride, acrylic acid, methyl methacrylate, alkyl substituted acrylates, aryl substituted acrylates, alkyl substituted methacrylates, aryl substituted methacrylates and 2-hydroxyethyl methacrylate.

In a specific embodiment, the acrylic monomer is selected from the group consisting of glycidyl methacrylate, acrylic acid, methacrylic acid, 2-hydroxyethyl methacrylate, maleic anhydride, 2-dimethylaminoethyl methacrylate and 2-diethylaminoethyl methacrylate.

In a specific embodiment, the vinyl monomers of the first step are selected from a group consisting of styrene, substituted styrenes, substituted acrylates and substituted methacrylates.

In a specific embodiment, the acrylic monomer is selected from the group consisting of acrylic functional monomers bearing epoxy, acid, anhydride, amine, amide and hydroxyl groups.

In a specific embodiment, the one or more monomers in the second step is styrene.

In a more specific embodiment, the acrylic monomer is glycidyl methacrylate and the vinyl monomer used in the first step is styrene.

In a more specific embodiment, the acrylic monomer is acrylic acid and the vinyl monomer used in the first step is styrene.

In a more specific embodiment, the acrylic monomer is maleic anhydride and the vinyl monomer used in the first step is styrene.

In a more specific embodiment, the acrylic monomer is 2-hydroxyethyl methacrylate and the vinyl monomer used in the first step is styrene.

In a more specific embodiment, the acrylic monomer is 2-diethylaminoethyl methacrylate and the vinyl monomer used in the first step is styrene.

In a more specific embodiment, the acrylic monomer is glycidyl methacrylate, the vinyl monomer used in the first step is styrene and the vinyl monomers used in the second step are styrene and N-phenylmaleimide.

In a more specific embodiment, the acrylic monomer is glycidyl methacrylate, the vinyl monomer used in the first step is styrene and the vinyl monomers used in the second step are styrene, N-phenylmaleimide and methyl methacrylate.

In another more specific embodiment, the acrylic monomer is glycidyl methacrylate, the vinyl monomer used in the first step is styrene and the vinyl monomers used in the second step are styrene, methyl methacrylate and butyl acrylate.

In the present invention the proportion of the functional acrylic monomer in step one is in the range of from about 0.1 to about 98 percent by weight, more preferably in the range of from about 5 to about 95 percent by weight.

In the present invention the reaction product from step 1 contains residual unreacted monomers. The residual monomers from the first block contain at least 1% w/w of the functionalized acrylic monomer, but more preferably contain in the range of 5-95% w/w, and most preferably in the range of 5-85% w/w. The weight or mass percentage of a component is the weight or mass of the component divided by the weight or mass of the mixture that contains the component and is indicated by the notation % w/w or % wt or wt %.

In cases where the monomers do not react with acids, acids can be used as promoters to reduce the reaction time. Promoters include, but are not limited to, strong acids, mineral acids, sulfonic acids, acidic clays, organic sulfonic acids, carboxylic acids, acidic salts of any of these acids and monoester of sulfurous and sulfuric acids.

Process Conditions

The synthesis conditions of the polymerization reaction for obtaining the copolymers of the present invention are described next. Bulk or solution processes can be employed. For the solution process, any solvent that forms a solution with the initial monomers, initiator and stable free radical or alcoxyamine can be used. In the cases where a solvent is added during the second step, any solvent that forms a solution with the initial block, remaining monomers and additional monomers can be used. Typical solvents include aromatic or substituted aromatic hydrocarbons, as well as aliphatic and substituted aliphatic hydrocarbons. If used, the preferred solvents are substituted aromatics, more preferably toluene, xylene or ethyl benzene or polar solvents like acetone, chloroform, ethyl acetate or water. When used, the solvent is preferably present in amounts of about 5 to about 95% by weight on the basis of the mixture of monomers and solvent.

With a low percentage of solvent, the solvent process is similar to a bulk process, and the solvent is mainly used to control the reaction rate, to better remove the heat of reaction, to lower the viscosity and to allow for larger compositions of monomers that are non miscible in all proportions (for example styrene/maleic anhydride or styrene/N-phenylmaleimide, or styrene/acrylamide) without having phase separation. A low percentage of solvent is preferably 10-30% by weight and more preferably 15-25% by weight with respect to the mixture of monomers and solvent. A solvent percentage of less than about 5% is of practically no use as the advantages of using solvent are not apparent. It may be better to switch to a bulk process rather than use a very low percentage of solvent.

With a high percentage of solvent, the solution process is a typical solution process presenting much lower viscosity, lower rate of reaction, as well as easier temperature control and removal of heat generated by the polymerization reaction. A high solvent percentage preferably ranges between about 60 and about 95 percent by weight, more preferably between about 70 and about 90 weight % and most preferably between about 75 and about 88% by weight with respect to the mixture of monomers and solvent. A solvent percentage larger than about 95% leaves too little polymer to be produced, and the process becomes inefficient. Solvent percentages between about 30 and about 60% can be used, but are not recommended because they are too diluted to present the high productivity advantage of a bulk process and too concentrated to have the benefits given by the low viscosity of a typical solution process.

Preferred process temperatures are in the range of about 70 to about 180° C., but more preferably in the range of about 90 to about 170° C. and most preferably between about 110 and about 130° C. Temperatures lower than about 70° C. do not allow the nitroxide-type radical to act as a live polymer capping-decapping moiety, as is further explained below, because at these temperatures the nitroxide-type radical hinders the living character of the polymerization. Temperatures higher than about 200° C. promote too many side reactions, and the living character of the polymerization is also hindered under these conditions.

The initiator is typically used in a proportion of about 1 part of initiator to about 50 to about 12,000 parts in moles of monomer, more preferably about 1 mole of initiator to about 100 to about 3,000 moles of monomer and most preferably about 1 mole of initiator to about 100 to about 1,500 moles of monomer. Mole proportions of about 1 part of initiator to less than about 50 parts of monomer yield polymer of very low molecular weight, which are usually not very good for applications involving compatibilization of polymer blends.

The aforementioned initiators have half-life times in the order of a few minutes or less, typically less than 10 min., at the preferred process temperatures. The amount of stable free radical (SFR) with respect to initiator is preferably in the range of about 1 to about 1.9 moles per mole of initiator, more preferably between about 1 and about 1.6 moles per mole of initiator. Ratios of SFR to initiator smaller than about 1 mole of SFR per mole of initiator lead to loss of the living character of the polymerization. However, ratios larger than about 1.9 moles of SFR per mole of initiator can slow down the reaction too much and make the process uneconomical. Additional amounts of initiator can also be added in the second step of the polymerization.

After charging the ingredients, monomers, initiator and stable free radical or an alcoxyamine instead of the initiator and nitroxide, into a reactor and quickly heating to the proper temperature, most of the polymeric chains will start early in the reaction, since the initiator will decompose very fast at the specified temperature. The nearly simultaneous initiation of most of the chains will contribute to narrowing the polydispersity. Also, soon after initiation, and having added only one or to a few monomeric units, each living (growing or active) polymer chain will become dormant (deactivation) after being capped by the stable free radical, which will be present in a slight excess with respect to the number of growing or living chains. The dormant chain will remain in that state for some time until the stable free radical is released again (activation) and the chain becomes active or living again, and capable of adding one or more monomeric units until it becomes again dormant. The cycle of states living-dormant-living-dormant repeats itself a number of times until no more monomer is available for reaction, or the temperature is lowered below the minimum temperature for activation of the stable free radical, which is below around 100° C. for most of the available nitroxy radicals.

Irreversible termination reactions, such as those occurring by coupling reactions between two living chains, are hindered due to the lower effective concentration of living polymer. The resulting process is similar to a true living process (for example, anionic polymerization) and it is therefore considered to be quasi-living (also called "controlled"). Since all the chains grow at approximately the same rate and are initiated at about the same time, the molecular weight distribution tends to be narrow, with relatively low polydispersity. It is well known in the art that the degree of livingness of such polymerizations can be measured by the degree of linearity of the polymer number average molecular weight growth with conversion, and by the shifting of curves of the molecular weight distribution toward larger values as the polymerization proceeds.

After heating from 1 to 10 hours, more typically 1-6 hours, a conversion of about 10-95%, more typically around 40-85% is reached. Up to this point, a first block of a pseudo living random copolymer, with or without some degree of alternation, has been formed. At this point, a mixture of one or more vinyl monomers is added. These monomers, together with the remaining monomers from the first step, will constitute a second block. Once the solution is heated again the chains will continue growing, due to the dormant-living repetitive cycles, adding monomer units from the residual (unreacted) monomer from the first step and also from the monomers added in the second step, according to their reactivity, until all the monomer is depleted or the reaction is terminated otherwise.

In the process just described, the temperature can be constant and set at one of the values mentioned in the preferred embodiments of the present invention or can be changed in an increasing fashion, still in the range given in the preferred embodiments of this invention, in order to accelerate the monomer depletion after the initial conversion stages.

Structure of the Block Copolymers

Block copolymers according to the present invention comprise a first block comprising monomeric units of a functionalized acrylic monomer and monomeric units of a vinyl monomer and a second block comprising monomeric units of one or more vinyl monomers and monomeric units of the functionalized acrylic monomer in the first block.

Given the synthesis procedure described above, and the fact that the reactivity ratios determine the instantaneous composition of the copolymer chains being added to the growing chains, each main block or portion of the copolymer will show some drift in composition, strictly making each one of the main portions a gradient copolymer. In this way, these blocks or portions will have some random character as well as some gradient character. What character dominates each block or portion will depend on how different the reactivity ratios are and the addition sequence of monomers followed during the synthesis. Also, the synthesis procedure will dictate the average composition of each of the main blocks or portions in the final copolymer chain. In the case where the vinyl monomers added in the second step tend to alternate with the remaining monomers from the first step, the polymerization will yield a triblock, since once the monomer that tends to alternate is depleted, the other monomers will continue to homo or copolymerize.

A typical composition of the copolymers obtained is:

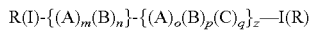

$$R(I)\text{-}\{(A)_m(B)_n\}\text{-}\{(A)_o(B)_p(C)_q\}_z\text{—}I(R)$$

where

R is the residue of a nitroxide used to regulate the polymerization of the compatibilizer;

I is the residue of a radical initiator used to initiate polymerization or the labile alkyl group originally bonded to oxygen of the nitroxide group contained in an alcoxyamine;

A is an acrylic monomer having functional groups,

B and C are vinyl monomers, which are either different or the same;

m is an integer from 5 to 500;

n is an integer from 1 to 400;

o is an integer from 1 to 450; o is smaller than m;

p is an integer from 0 to 350; p is smaller than n; and q is an integer from 1 to 900.

Considering the composition of these main blocks or portions of the final resulting copolymer formed, one possible architecture will comprise: i) a block of mostly random copolymer A and B (with composition drift), ii) a mostly gradient copolymer portion or block, consisting of a terpolymer A, B and C (possibly only A and C if monomer B was depleted during the first stage), and iii) towards the end of the second portion or block, the chain will consist only of a block of C and possibly A, which can be considered a block on its own. In the case that some monomer B remains after the first stage, the second block or portion will be a gradient copolymer gradually richer in C and less rich in B.

More monomers can be included in the block copolymers. For example, if a fourth monomer D is added during the first block synthesis, the resulting structure will include monomer D in the first and second block, in a concentration that depends on its initial concentration and reactivity. Thus the composition of this diblock could be described as: $R(I)\text{-}\{(A)_m(B)_n(D)_r\}\text{-}\{(A)_o(B)_p(D)_t(C)_q\}\text{-}I(R)$ where r is an integer from 1 to 400 and t is an integer, smaller than r. If monomer D is added during the second block synthesis, the resulting structure will include D only in the second block. Thus the composition of this diblock could be described as: $R(I)\text{-}\{(A)_m(B)_n\}\text{-}\{(A)_o(B)_p(C)_q(D)_t\}\text{-}I(R)$, where t is an integer from 1 to 400. In case where monomer D tends to alternate with the remaining monomers from the first step, the polymerization will yield a triblock, since once monomer D is depleted, the other monomers will continue to homo or copolymerize.

The functional groups contained in the acrylic monomers can be, but are not limited to, epoxy, acid, anhydride, amine, amide and hydroxyl groups. Preferred acrylic monomers having functional groups include glycidyl methacrylate, acrylic acid, methacrylic acid, 2-hydroxyethyl methacrylate, maleic anhydride, 2-dimethylaminoethyl methacrylate and 2-diethylaminoethyl methacrylate.

Examples of vinyl monomers are styrene, substituted styrenes, ethylene, isoprene, isobutylene, butadiene, acrylates, methacrylates, substituted acrylates, substituted methacrylates, acrylonitrile, N-phenyl maleimide, N-cyclohexyl maleimide, maleic anhydride. Preferred vinyl monomers in the first block are styrene, substituted styrenes, acrylates, methacrylates, substituted acrylates and substituted methacrylates.

Preferred vinyl monomers in the second block are styrene, substituted styrenes, acrylonitrile, N-aromatic substituted maleimides, N-alkyl substituted maleimides, maleic anhydride, acrylic acid, methyl methacrylate, alkyl substituted acrylates, aryl substituted acrylates, alkyl substituted methacrylates, aryl substituted methacrylates and 2-hydroxyethyl methacrylate.

In a specific embodiment the acrylic monomer is glycidyl methacrylate and the vinyl monomer in the first and second block is styrene.

In a specific embodiment the acrylic monomer is glycidyl methacrylate, the vinyl monomer in the first block is styrene and the vinyl monomers in the second block are styrene and N-phenylmaleimide.

In a specific embodiment the acrylic monomer is glycidyl methacrylate, the vinyl monomer used in the first block is styrene and the vinyl monomers in the second block are styrene, N-phenylmaleimide and methyl methacrylate.

In a specific embodiment the acrylic monomer is glycidyl methacrylate, the vinyl monomer in the first block is styrene and the vinyl monomers in the second block are styrene, methyl methacrylate and butyl acrylate.

Preferred concentration of the residual functional acrylic monomer in the residual monomers from the first block range about 1-95% w/w, but more preferably in the range of from about 5 to about 85% w/w.

Preferred concentration of the functionalized acrylic monomer in the block copolymer ranges between about 0.5 and about 70 weight percent but more preferably in the range of from about 0.5 to about 50% w/w.

To form a specific embodiment 1, shown below, in a system of monomers, A is glycidyl methacrylate, B is styrene and C is styrene. Glycidyl methacrylate tends to react in a random fashion with styrene forming a first block consisting of poly(styrene-co-glycidyl methacrylate). In the second step, styrene will be added resulting in a gradient block containing fewer glycidyl methacrylate molecules, since the remaining glycidyl methacrylate from the first block is diluted with more styrene added in the second step, forming embodiment 1. The amount of monomeric units in the first block can be controlled with the first block conversion, and the amount of monomeric units in the second block can be controlled either with the amount of monomer added in the second step or with the final conversion. The composition of each block can be controlled by the mole percent of monomers added during the first and second step.

Embodiment 1

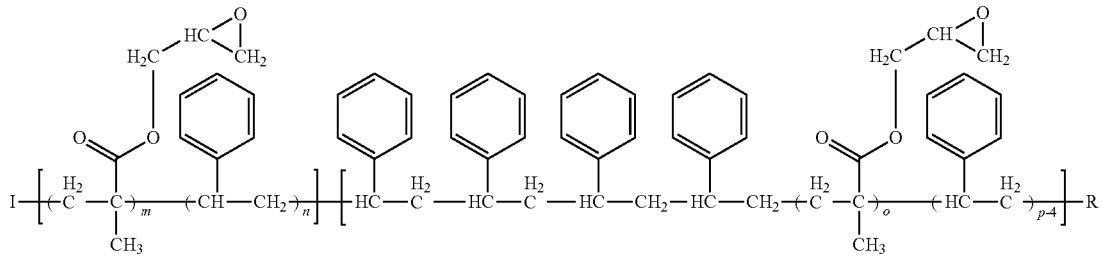

Where:
I is the residue of a radical initiator used to initiate polymerization or the labile alkyl group originally bonded to oxygen of the nitroxide group contained in an alcoxyamine;
R is the residue of a nitroxide used to regulate the polymerization of the compatibilizer;
m is an integer from 5 to 500;
n is an integer from 1 to 400;
o is an integer from 1 to 450; o is smaller than m; and
p is an integer from 0 to 350.

Considering the composition of these main blocks or portions of the final resulting copolymer formed, one possible architecture will comprise: i) a block of mostly random copolymer A and B (with composition drift), ii) an alternating copolymer consisting of a terpolymer A, B and C or an alternating copolymer of A and C or an alternating copolymer of B and C, depending on the reactivities of each monomer, and iii) once monomer C is depeleted, the remaining monomer or monomers will continue to homo or copolymerize forming a third block.

Another typical composition of the copolymers obtained is:

$$R(I)\text{-}\{(A)_m(B)_n\}\text{-}\{(A)_o(B)_p(C)_q\}_z\text{-}\{(A)_r(B)_s\}_z\text{—}I(R)$$

where
R is the residue of a nitroxide used to regulate the polymerization of the compatibilizer;
I is the residue of a radical initiator used to initiate polymerization or the labile alkyl group originally bonded to oxygen of the nitroxide group contained in an alcoxyamine;
A is an acrylic monomer having functional groups;
B and C are different vinyl monomers;
m is an integer from 5 to 500;
n is an integer from 1 to 400;
o is an integer from 1 to 450; o is smaller than m;
p is an integer from 0 to 350; p is smaller than n;
q is an integer from 1 to 900;
r is an integer from 0 to 450; r is equal or smaller than o; and
s is an integer from 0 to 350; s is equal or smaller than p.

In a specific embodiment the monomers are: A=glycidyl methacrylate, B=styrene, C=N-phenyl maleimide and D=styrene. Monomers A and B are charged in the first step, producing a random copolymer. After a 66-70% conversion is reached, monomers C and D are added. In this second block, styrene will alternate with N-phenyl maleimide also incorporating the remaining glycidyl methacrylate. Depending on the proportions of monomers A, B, C and D, and the conversion reached in the second block, the second block can be: i) mainly an alternating block, or ii) mainly an alternating block and after monomer C and A are depleted, monomer B/D can continue forming a third block of homopolymer or iii) mainly an alternating block and after monomer C is depleted, monomers B/D and A can continue forming a third copolymer block. The structures obtained in each case (i, ii, and iii) are shown below as Embodiments 2a, 2b and 2c.

R is the residue of a nitroxide used to regulate the polymerization of the compatibilizer;
m is an integer from 5 to 500;
n is an integer from 1 to 400;
o is an integer from 1 to 450; o is smaller than m;
p is an integer from 0 to 350; p is smaller than n;
q is an integer from 1 to 900;
r is an integer equal or smaller than o; and
s is an integer smaller than p.

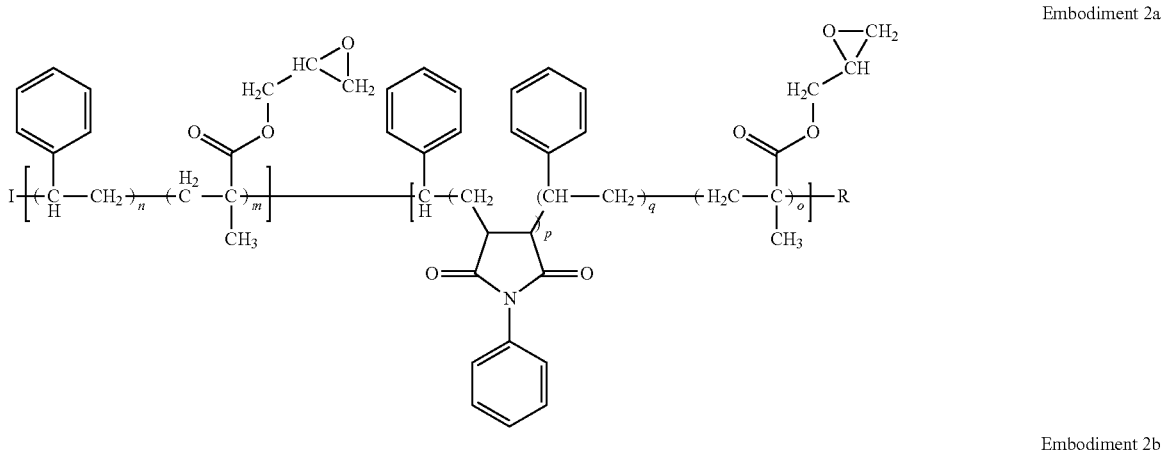

Embodiment 2a

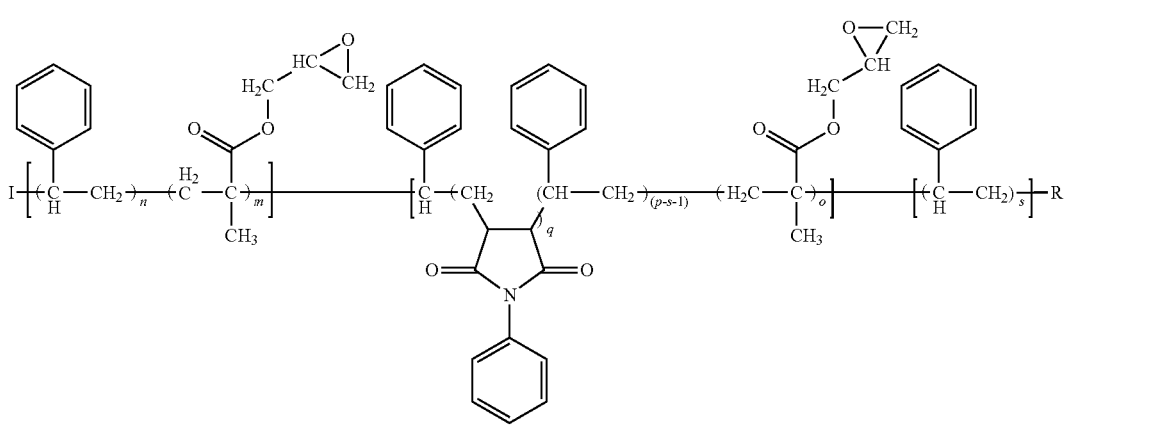

Embodiment 2b

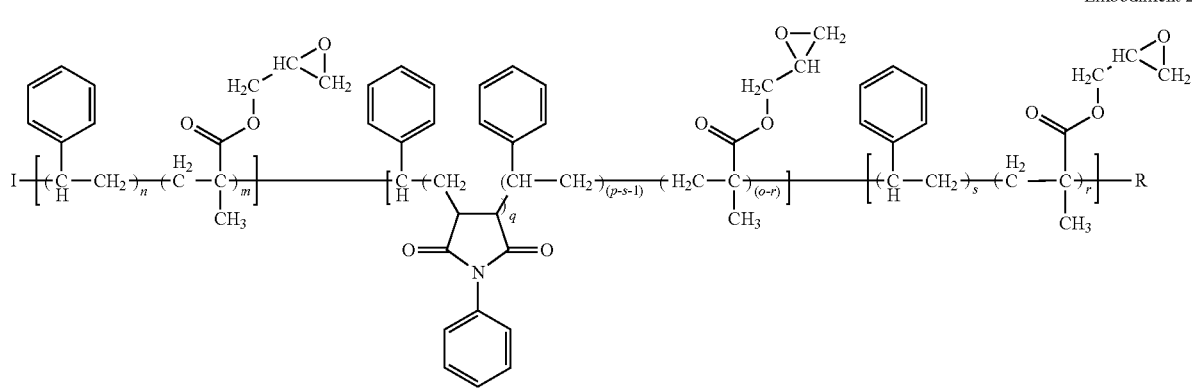

Embodiment 2c

Where in Embodiments 2a, 2b and 2c:
I is the residue of a radical initiator used to initiate polymerization of the compatibilizer or the labile alkyl group originally bonded to oxygen of the nitroxide group contained in an alcoxyamine;

The different structures shown in Embodiments 2a, 2b and 2c can be obtained by modifying the proportions of monomers and the conversions of the first and the second block, which makes this a very versatile procedure for obtaining a variety of structures.

The block copolymers of the present invention use acrylic monomers as "carriers" of functional groups since one can find almost all important functional groups in commercially available and relatively economic acrylic monomers. For example, the epoxy group can be introduced by using glycidyl methacrylate, the acid group by using acrylic acid, the anhydride group by using maleic anhydride, the amine group by using 2-(diethylamino)ethyl methacrylate, the amide group by using acrylamide or maleimide and the hydroxyl group by using 2-hydroxyethyl methacrylate. Another advantage is that the functional acrylic monomer that is incorporated in the second block can raise its polarity making it more miscible with certain thermoplastic polymers (this polarity can be tuned by adjusting the amount of residual functional acrylic monomer and the amount of monomers added in the second step), since acrylic monomers, in general, have higher polarities compared to other monomers, such as vinyl aromatic monomers. The presence of functional acrylic monomers in the first block and in the remaining unreacted monomers of the first step, yields a mixture with a high enough polarity to directly incorporate other highly polar monomers in the second step, such as N-phenyl maleimide and methyl methacrylate, without having to add a solvent. The commercial availability and variety of functional groups found in relatively inexpensive acrylic monomers and the higher polarity of these types of monomers are advantageous over the use of vinyl aromatic monomers with functional groups, such as described in U.S. Pat. No. 6,531,547 B1 and in International Application Publication No. WO 2004 005361 A1.

Depending on the nature of the functional acrylic monomers, the block copolymers can be water soluble, they can carry positive or negative charge or charges in their functional groups or they can be neutral. Also depending on the nature of the functional acrylic monomers and the vinyl monomers, block copolymers can form amphiphilic copolymers. In prior art processes for the production of block copolymers using living polymerizations, a sequence of several chemical steps is necessary: in a first step the monomer forming the first block is homopolymerized until it is consumed, if pure blocks are to be obtained. If the first monomer is not totally consumed, it has to be removed before the second monomer is added. In a further chemical step, a second monomer is added, and it polymerizes, extending the living chains formed during the first step and generating a second block. The need to remove the residual monomer before the charge of a second monomer represents an additional and likely difficult step, which is avoided by the process of the present invention.

Triblock Copolymer

A triblock copolymer can be made according to the present invention using a two-step process comprising: 1) reacting an acrylic monomer having functional groups and one or more vinyl monomers in the presence of a bifunctional controlling agent (see for example U.S. Pat. No. 6,258,911 B1) to form a reaction product, wherein the reaction product includes residual unreacted acrylic monomer, and 2) reacting one or more vinyl monomers with the reaction product from step one, wherein the blocks formed incorporate the residual unreacted acrylic monomer. Solvents can be used optionally in either or both steps. Radical initiators can be used optionally in either or both steps.

One possible structure of triblock copolymers is:

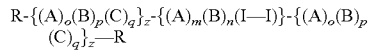

where
R is the residue of a nitroxide or controlling agent used to regulate the polymerization of the compatibilizer;

I—I is the residue of a molecule used to initiate polymerization or the labile alkyl group originally bonded to oxygen of the nitroxide group contained in an alcoxyamine;

A is an acrylic monomer having functional groups;
B and C are different or equal vinyl monomers;
m is an integer from 5 to 500;
n is an integer from 1 to 400;
o is an integer from 1 to 450; o is smaller than m;
p is an integer from 0 to 350; p is smaller than n; and
q is an integer from 1 to 900.

Depending on the different vinyl monomers added during the first and second step, the amount of controlling agent and initiator and the conversion of each step, a wide variety of structures can be obtained.

A procedure that can be used to obtain triblock copolymers containing functional acrylic monomers in two or three of their blocks consists of continuing the polymerization after a certain conversion of the second block polymerization has been reached. The third block can be optionally synthesized after the diblock is purified, by dissolving it in one or more vinyl monomers. Optionally, more initiator can be added, and optionally, solvent can be used.

Batch Process

The present invention also provides a chemical batch process to perform the polymerization reaction, which is performed in two process stages as follows:
a) A first stage involving adding all the reactants comprising the first block of the block copolymer into a reactor with agitation and heating to reach conversions of about 14 to about 95%, and
b) A second stage involving adding additional monomers to the product of the first reactor and continuing the reaction in a different reactor vessel or vessels without agitation, up to conversions of about 90 to about 100%.

The reactor used in the first step is a well agitated reactor supplied with a helical-type or anchor-type impeller. This reactor must also have some means of exchanging heat with the exterior by a device such as a jacket or a coil for heating and cooling. After reaching conversions in the range of 14-95%, more preferably 50-90%, the viscosity of the reaction mixture will increase and stirring will be difficult, so the reaction product is transferred to a mixing tank where additional monomers are added prior to a final transfer to a reactor where the reaction is completed. This second reactor is preferably a vessel without an agitation device for easier cleaning, such as a slab-shaped or cylinder-shaped reactor or reactors. This second reactor should also be provided with some way of exchanging heat such as an external jacket, immersion in a thermal fluid, or any other similar means. After reaching high conversion, which can be aided by increasing the temperature as the reaction time proceeds, the polymer is removed from the second stage reactor or reactors and ground into smaller pieces in a mechanical mill. Final conversions of less than about 90% are not convenient as much residual monomer would be left, affecting the properties and handling of the final product.

FIG. 1

With reference to FIG. 1, a batch process 10 according to the present invention is shown schematically. A solution of nitroxy radical, an acrylic monomer having functional groups and one or more vinyl monomers are added to a tank 12, which is connected through a line 14 to a pump 16. The mixture in tank 12 is pumped through line 18 into a reactor 20. A catalyst or initiator is placed in tank 22, which is connected by a line 24 to a pump 26. Pump 26 pumps the catalyst or initiator through a line 28 into reactor 20. Reactor 20 is a continuous stirred tank reactor and is connected by a line 30 to a pump 32. After the first block of the block copolymer is formed in reactor 20, the copolymer and unreacted monomer are pumped by pump 32 through a line 34 to mixing tank 36. A solution of one or more vinyl monomers is added to tank 38. The contents of tank 38 flow through a line 40 to a pump 42, which pumps the contents through a line 44 to the mixing tank 36. These monomers will become part of the second block of the block copolymer. The agitated mixing tank 36 is connected by a line 46 to a pump 48. After the additional monomers are thoroughly mixed the solution is pumped by pump 48 through a line 50 to a set of slab molds 52. Conversion in reactor 20 is typically in the range of from about 14 to about 95%. Slab molds 52 provide a second reactor vessel, which is without agitation, and heat is shown added and removed schematically through a line 54 to a thermal bath 56. Various methods can be used to remove heat, such as by a jacketed reactor or by circulation of reactants through a heat exchanger. The solid polymer coming from the slab molds is then ground using a granulator 58, typically a rotary knife granulator or a hammer mill. The ground product is then ready for packaging or can optionally be dried in an oven to remove any residual monomer left over from the final polymerization step.

The acrylic monomer having functional groups, one or more vinyl monomers, nitroxy radical and initiator can be charged directly to reactor 20. By adjusting or manipulating the ratio of initiator to monomer and/or the ratio of the nitroxy radical to initiator, the molecular weight of the copolymer can be controlled. Examples are provided below, which provide further insight on the impact of these ratios on molecular weight. In this manner, the microstructure of the block copolymer can be controlled and thus made as desired. Reactor 20 has been shown as a continuous stirred tank reactor, but other types of reactors can be used, preferably providing some type of agitation. Reactor 52 has been shown as a slab mold reactor, but other types of reactors, such as a tubular reactor, can be used, preferably providing a quiescent reaction zone.

Continuous Process

The present invention further provides a bulk or solution continuous process to perform the polymerization reaction, comprising two process steps in series as follows:
  a) A first step involving heating the reaction mixture in a continuous stirred tank reactor with exit conversions between 14 and 95% weight, and
  b) A second step involving heating in a kneader-mixer reactor in which the exit conversion is between about 60 and about 100%

The reactor used in the first step is similar to the one just described for the batch process; that is, a well agitated reactor supplied with a helical-type or anchor-type impeller and provided with some means of exchanging heat with the exterior. The preferred conversions are between about 10-95%, more preferably 50-90% at the temperatures preferred in this invention. Conversions smaller than about 10% will make the use of the first reactor inefficient and conversions larger than about 95% will make the process difficult to control due to the high viscosity of the reaction mixture and may broaden too much the molecular weight distribution of the polymer, rendering the material heterogeneous. The second reactor is a kneader-mixer, as shown for example in U.S. Pat. Nos. 4,824, 257; 5,121,992; and 7,045,581 and in Publication No. WO2006034875, which provides further conversion without broadening too much the molecular weight distribution and allows for easier polymer transport and heat removal. Kneader-mixers exhibit narrower residence time distributions than their agitated tank counterparts, and it is well known in the art that, for living or quasi-living polymerization reactions, the molecular weight distribution of the polymer is determined by the residence time distribution of the reactor. Also, since the conversion in the second reactor is higher than in the first one, the viscosity will also be very high and in these conditions kneader-mixers provide an ideal way to transport the polymer and remove the heat of reaction, since these reactors generally have a better area-to-volume ratio for heat exchange. Conversions smaller than about 60% at the exit result in an inefficient use of the second reactor and leave too much unreacted monomer. After the second reactor, the process must provide some means of removing the unreacted monomer, such as devolatilizer equipment or an extruder with venting. Unreacted monomer can be recovered and recycled to the process.

FIG. 2

Figure 2:
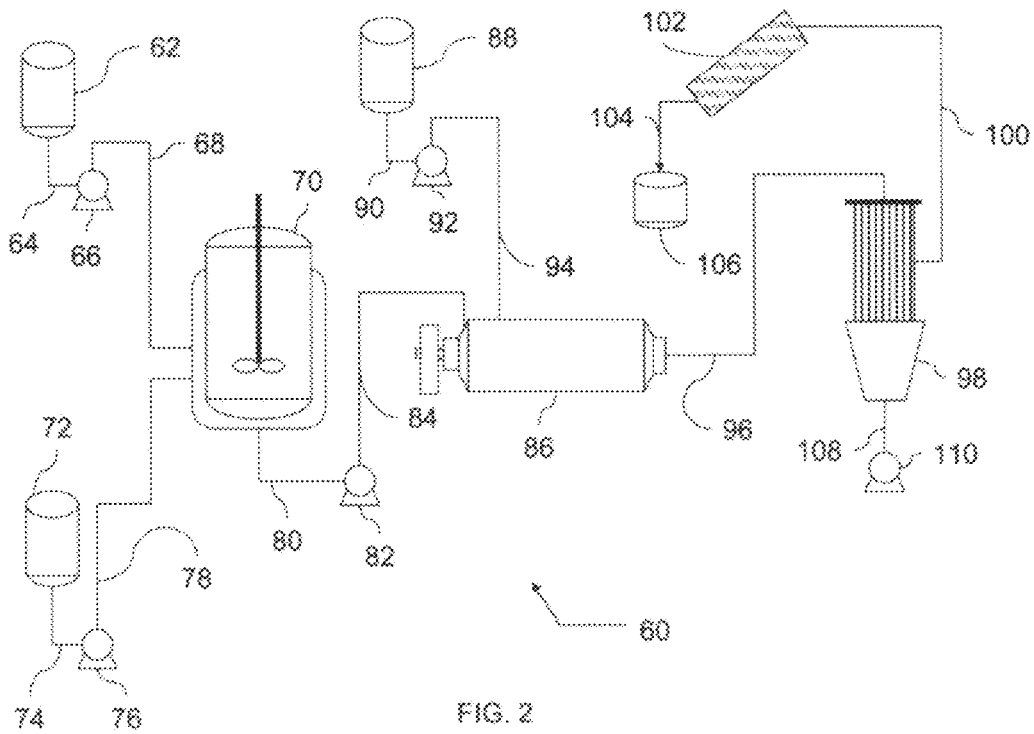
FIG. 2 is a process schematic of a continuous process according to the present invention.

With reference to FIG. 2, a continuous process 60 is shown schematically according to the present invention. A solution of nitroxy radical, an acrylic monomer having functional groups and one or more vinyl monomers are added to tank 62. The contents of tank 62 flow through a line 64 to a pump 66, which pumps the contents through a line 68 to reactor 70, which can be a continuous stirred tank reactor. A catalyst or initiator is placed in tank 72, and the contents of tank 72 flows through a line 74 into a pump 76, which pumps the catalyst or initiator through a line 78 into reactor 70. The first block of the block copolymer is formed in reactor 70, where conversion is preferably in the range of from about 14 to about 95%. The copolymer and unreacted monomer flow out of reactor 70 through a line 80 into a pump 82, which pumps the fluid through a line 84 into a tubular-type reactor 86, which can be a kneader-mixer. A solution of one or more vinyl monomers is added to tank 88. The contents of tank 88 flow through a line 90 to a pump 92, which pumps the contents through a line 94 to the reactor 86. A conversion ranging from about 60 to about 100% is achieved in reactor 86, and the block copolymer and unreacted monomer flow out of reactor 86 through a line 96 into a devolatilizer 98. Monomer is recovered from devolatilizer 98 through a line 100, which flows into a condenser 102. A condensate is formed and flows through a line 104 into a condensate tank 106. Block copolymer is withdrawn from devolatilizer 98 through a line 108 into a pump 110 for transfer.

Blend Compatibilization

Another embodiment of this invention is the use of the reactive block copolymers as a compatibilizer in compositions, comprising:
  (a) 1-98 wt % of a thermoplastic having functional groups selected from the group comprising: amino, amide, imide, carboxyl, carbonyl, carbonate ester, anhydride, epoxy, sulfo, sulfonyl, sulfinyl, sulfhydryl, cyano and hydroxyl;
  (b) 0.01-25 wt % of a block copolymer comprising:
    i) a first block comprising monomeric units of a functionalized acrylic monomer and monomeric units of a vinyl monomer; and
    ii) a second block comprising monomeric units of one or more vinyl monomers and monomeric units of the functionalized acrylic monomer in the first block, where the block copolymer contains functional groups capable of reacting with the chemical moieties of thermoplastics including the thermoplastics having the functional groups in component (a), preferably having Mn of 5,000 to 350,000; and
  (c) 1-98 wt % of a thermoplastic polymer miscible or compatible with the second block of the block copolymer described in component (b). 32. Preferred block copolymer Mn in thousands is 8.5-350, 5-200, 10-150 or 20-120.

The invention thus provides many applications in which the inventive block copolymer is used as a compatibilizer, which provides a composition of matter for a compatibilized blend as well as a method of use for the compatibilizer.

Polymers miscible or compatible with the first block of the aforementioned block copolymer include those which may be described as hydrogenated or partially hydrogenated homopolymers, and random, tapered, or block polymers (copolymers, including terpolymers, tetrapolymers, etc.) of conjugated dienes and/or monovinyl aromatic compounds. The conjugated dienes include isoprene, butadiene, 2,3-dimethylbutadiene and/or mixtures thereof, such as isoprene and butadiene. The monovinyl aromatic compounds include any of the following and mixtures thereof: monovinyl monoaromatic compounds, such as styrene or alkylated styrenes substituted at the alpha-carbon atoms of the styrene, such as alpha-methylstyrene, or at ring carbons, such as o-, m-, p-methylstyrene, ethylstyrene, propylstyrene, isopropylstyrene, butylstyrene, isobutylstyrene, tert-butylstyrene (e.g., p-tert-butylstyrene). Also included are vinylxylenes, methylethyl styrenes, and ethylvinylstyrenes. Specific examples include random polymers of butadiene and/or isoprene and polymers of isoprene and/or butadiene and styrene and also esterospecific polymers such as syndiotactic polystyrene. Typical block copolymers include polystyrene-polyisoprene, polystyrene-polybutadiene, polystyrene-polybutadiene-polystyrene, polystyrene-ethylene butylene-polystyrene, polyvinyl cyclohexane-hydrogenated polyisoprene, and polyvinyl cyclohexane-hydrogenated polybutadiene. Tapered polymers include those of the previous monomers prepared by methods known in the art. Other non-styrenic polymers miscible or compatible with the second block of the copolymer include, but are not limited to, polyphenylene ether (PPE), polyvinyl methyl ether and tetramethyl polycarbonate, methyl methacrylate, alkyl substitued acrylates, alkyl substitued methacrylates and their copolymers with styrene. It also comprises polyolefins, where the term polyolefin is defined as a polymer the majority of whose monomers are olefins and may be polyethylene, polypropylene or co-polymers of ethylene and either propylene or vinyl acetate. It also comprises engineering thermoplastic such as: aliphatic and aromatic polycarbonates (such as bisphenol A polycarbonate), polyesters (such as poly(butylene terephthalate) and poly(ethylene terephthalate)), polyamides, polyacetal, polyphenylene ether or mixtures thereof. All these engineering thermoplastics are prepared according to well known commercial processes. Reference to such processes can be found in technical publications such as Encyclopedia of Polymer Science and Engineering, John Wiley and Sons., 1988, under the respective engineering thermoplastic polymer topic heading.

Thermoplastic Polymers that Have Functional Groups

Preferred thermoplastic polymers having functional groups are selected from the group consisting of: aliphatic and aromatic polycarbonates (such as bisphenol A polycarbonate), polyesters (such as poly(butylene terephthalate) and poly(ethylene terephthalate)), polyamides, polyacetal, polyphenylene ether, polyolefins having epoxy, anhydride or acid functionalities, polysulfones, polurethanes and mixtures thereof. All these thermoplastics are prepared according to well-known commercial processes. Reference to such processes can be found in technical publications such as Encyclopedia of Polymer Science and Engineering, John Wiley and Sons., 1988, under the respective thermoplastic polymer topic heading. Specific details on polycondensation engineering thermoplastics follow.

The polyphenylene ethers and polyamides of the present invention are as described in U.S. Pat. No. 5,290,863, which is incorporated herein by reference. The polyphenylene ethers comprise a plurality of structural units having the formula:

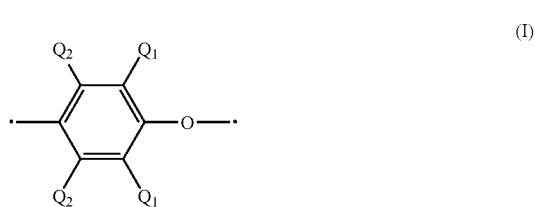

(I)

In each of said units, each independent Q1 is independently halogen, primary or secondary lower alkyl (i.e. alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each Q2 is independently hydrogen, halogen, primary or secondary lower alkyl, phenyl, haloalkyl, hydrocarbonoxy or halohydrocarbonoxy as defined for Q1.

Examples of suitable primary or lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl are isopropyl and sec-butyl.

Preferably, any alkyl radicals are straight chain rather than branched. Most often, each Q1 is alkyl or phenyl, especially C1-4 alkyl, and each Q2 is hydrogen. Suitable polyphenylene ethers are disclosed in a large number of patents.

The polyphenylene ethers are typically prepared by the oxidative coupling of at least one corresponding monohydroxyaromatic compound. Particularly useful and readily available monohydroxyaromatic compounds are 2,6-xylenol, wherein each Q1 is methyl and each Q2 is hydrogen and wherein the resultant polymer is characterized as a poly(2,6-dimethyl-1,4-phenylene ether), and 2,3,6-trimethylphenol, wherein each Q1 and one Q2 are methyl and the other Q2 is hydrogen.

Both homopolymer and copolymer polyphenylene ethers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinyl aromatic compounds (e.g. styrene), or such polymers as polystyrenes or elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates quinones, heterocycles and formals.

The polyphenylene ether generally has a number average molecular weight within the range of about 3,000 and a weight average molecular weight within the range of about 20,000, as determined by gel permeation chromatography. Its intrinsic viscosity is most often in the range of about 0.15-0.6 dl/g, as measured in chloroform at 25° C.

The polyphenylene ethers which may be employed for the purposes of this invention include those which comprise molecules having at least one of the end groups of the formulae

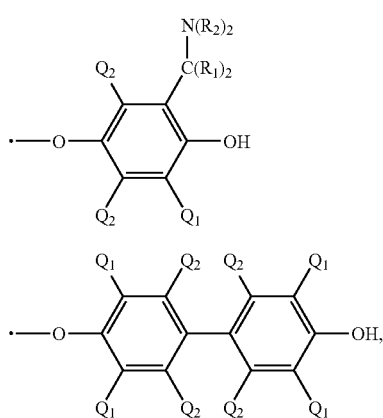

wherein $Q_1$ and $Q_2$ are as previously defined; each $R_1$ is independently hydrogen or alkyl, with the proviso that the total number of carbon atoms in both $R_1$ radicals is 6 or less; and each $R_2$ is independently hydrogen or a $C_{1-6}$ primary alkyl radical. Preferably, each $R_1$ is hydrogen and each $R_2$ is alkyl, especially methyl or n-butyl.

Polymers containing the aminoalkyl-substituted end groups of formula (II) may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more Q1 radicals. The principal site of reaction is the Q1 radical adjacent to the hydroxy group on the terminal unit of the polymer chain. During further processing and/or blending, the aminoalkyl-substituted end groups may undergo various reactions, probably involving a quinone methide-type intermediate of the formula

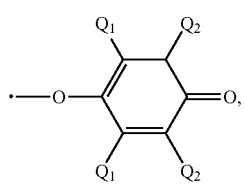

with numerous beneficial effects often including an increase in impact strength and compatibilization with other blend components, as pointed out in references cited in U.S. Pat. No. 5,290,863.

It will be apparent to those skilled in the art from the foregoing that the polyphenylene ethers contemplated for use in the present invention include all those presently known, irrespective of variations in structural units or ancillary chemical features.

Polyamides included in the present invention are those prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. The term "substantially equimolar" proportions include both strictly equimolar proportions and slight departures there from which are involved in conventional techniques for stabilizing the viscosity of the resultant polyamides. The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring containing the CO(NH) group in the case of a lactam. As particular examples of aminocarboxylic acids and lactams there may be mentioned -aminocaproic acid, butyrolactam, pivalolactam, -caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

HOOC—B—COOH    (V)

where B is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6(polycaprolactam), 6,6(polyhexamethylene adipamide), 11, 12, 4,6, 6,10 and 6,12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis-(p-aminocyclohexyl) propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 4,6, 6,6, 6,9, 6,10, 6,12, 11 and 12, most preferably polyamide-6,6. Commercially available thermoplastic polyamides may be advantageously used in the practice of this invention, with linear crystalline polyamides having a melting point between 165 and 230° C. being preferred.

Polyesters which may be employed as a component in compositions of the invention are, in general, relatively high in molecular weight and may be branched or linear polymers.

These include polyesters such as polyethylene terephthalate (PET), polybutylene terephthalate (PBT), polycyclohexane-bis-methylene terephthalate (PCT) and thermoplastic elastomeric, or combinations of these thermoplastic elastomeric polyesters with other above polyesters such as PBT. Polyesters suitable for compositions of the present invention include, in general, linear saturated condensation products of diols and dicarboxylic acids, or reactive derivatives thereof. Preferably, they are polymeric glycol esters of terephthalic acid and isophthalic acid. These polymers are available commercially or can be prepared by known techniques, such as by the alcoholysis of esters of the phthalic acid with a glycol and subsequent polymerization, by heating glycols with the free acids or with halide derivatives thereof, and similar processes. Such polymers and methods for their preparation are described further in references cited in U.S. Pat. No. 5,290,863, and elsewhere.

Preferred polyesters are of the family comprising high molecular weight, polymeric glycol terephthalates or isophthalates having repeating units of the formula

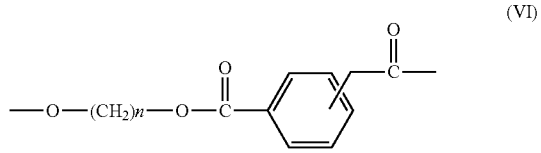

(VI)

where n is a whole number from two to ten, and more usually from two to four, and mixtures of such esters, including copolyesters of terephthalic and isophthalic acids of up to 30 mol percent isophthalic units.

Especially preferred polyesters are poly(ethylene terephthalate) and poly(1,4-butylene terephthalate).

Especially favored when high melt strength is important are branched high melt viscosity poly(1,4-butylene terephthalate) resins which include small amounts, for example, up to 5 mol percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, tetrols, such as pentaerythritol, triols, such as trimethylolpropane, or dihydroxy carboxylic acids and hydroxydicarboxylic acids and derivatives, such as dimethyl hydroxyterephthalate, and the like. The addition of a polyepoxide, such as triglycidyl isocyanurate, which is known to increase the viscosity of the polyester phase through branching can aid in improving the physical properties of the present blends.

The branched poly(1,4-butylene terephthalate) resins and their preparation are described in U.S. Pat. No. 3,953,404.

Illustratively, the high molecular weight polyesters useful in the practice of this invention have an intrinsic viscosity of at least about 0.2 deciliters per gram, and more usually from about 0.4 to 1.5 deciliters per gram as measured in solution in ortho-chlorophenol or a 60/40 phenol/tetrachloroethane mixture at 25° to 30° C.

The linear polyesters include thermoplastic poly(alkylene dicarboxylates) and alicyclic analogs thereof. They typically comprise structural units of the formula:

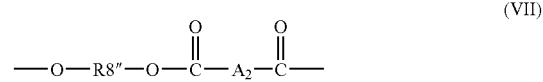

(VII)

where R8 is a saturated divalent aliphatic or alicyclic hydrocarbon radical containing about 2 to 10 and usually about 2 to 8 carbon atoms and A2 is a divalent aromatic radical containing about 6 to 20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly polyethylene and polybutylene terephthalate and especially the latter, are preferred. Such polyesters are known in the art as illustrated by references cited in U.S. Pat. No. 5,290,863.

The linear polyesters generally have number average molecular weights in the range of about 20,000 to 70,000, as determined by intrinsic viscosity at 30° C. in a mixture of 60% (by weight) phenol and 40% 1,1,2,2-tetrachloroethane. When resistance to heat distortion is an important factor, the polyester molecular weight should be relatively high, typically above about 40,000.

The polycarbonates suitable to be used in the present compositions include aliphatic and aromatic polycarbonates. Starting materials for aliphatic polycarbonates are diols and carbonates, eg, diethyl of diphenyl carbonate which are obtained by phosgenation of hydroxy compounds or 1,3-dioxolan-2-ones formed from CO2 and oxiranes. Aliphatic polycarbonates may also be prepared from 1,3-dioxan-2-ones obtained by thermal depolymerization of the corresponding polycarbonates.

Current methods for the preparation of aliphatic polycarbonates include transesterification of diols with lower dialkyl carbonates, dioxolanones or diphenyl carbonate in the presence of catalyst such as alkali metal, tin and titanium compounds. Ring-opening polymerization of six-membered cyclic carbonates (1,3-dioxan-2-ones), in the presence of bicyclic carbonates which act as crosslinking agents, leads to hard, tough thermosets. Crosslinked polycarbonates with outstanding properties are also obtained by free radical polymerization of diethylene glycol bis(allylcarbonate). Based on ethylene glycol carbonate, other phosgene routes have been found, starting with CO2 with urea or a dialkyl carbonate as an intermediate, or from CO. Other routes involves the cationic or free radical, ring-opening polymerization of cyclic ortho esters of carbonic acid. These reactions give polyether polycarbonates.

The molecular weights of linear aliphatic polycarbonates are process-dependent and are between 500 and 5000. Polycarbonates with molecular weights up to about 30,000 are obtained by transesterification, whereas those with a molecular weight greater than 50,000 are prepared by polymerization of carbonates possessing six-membered rings.

Among the preferred polycarbonates are the aromatic polycarbonate homopolymers. The structural units in such homopolymers generally have the formula

(VIII)

wherein $A_3$ is an aromatic radical. Suitable $A_3$ radicals include m-phenylene, p-phenylene, 4,4'-biphenylene, 2,2-bis(4-phenylene)propane, 2,2-bis(3,5-dimethyl-4-phenylene)propane and similar radicals such as those which correspond to the dihydroxyaromatic compounds disclosed by name or formula, generically or specifically, in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A_3$ radicals are hydrocarbon radicals.

The A3 radicals preferably have the formula

$$-A_4-Y(A5( \qquad (IX)$$

wherein each of A4 and A5 is a single-ring divalent aromatic radical and Y is a bridging radical in which one or two atoms separate A4 from A5. The free valence bonds in formula IX are usually in the meta- or para-positions of A4 and A5 in relation to Y. Such A3 values may be considered as being derived from bisphenols of the formula HO (A4 (Y (A5(OH. Frequent reference to bisphenols will be made hereinafter, but it should be understood that A3 values derived from suitable compounds other than bisphenols may be employed as appropriate.

In formula IX, the A4 and A5 values may be unsubstituted phenylene or substituted derivatives thereof, illustrative substituents being one or more alkyl, alkenyl (e.g., crosslinkable-graftable moieties such as vinyl and allyl), halo (especially chloro and/or bromo), nitro, alkoxy and the like. Unsubstituted phenylene radicals are preferred. Both A4 and A5 are preferably p-phenylene, although both may be o- or m-phenylene, or one may be o-phenylene or m-phenylene and the other p-phenylene.

The bridging radical, Y, is one in which one or two atoms, preferably one, separate A4 from A5. It is most often a hydrocarbon radical, and particularly a saturated radical such as methylene, cyclohexylmethylene, 2-[2,2,1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gemalkylene radical. Also included, however, are unsaturated radicals and radicals which are entirely or partially composed of atoms other than carbon and hydrogen. Examples of such radicals are 2,2-dichloroethylidene, carbonyl, thio, oxy, and sulfone. For reasons of availability and particular suitability for the purposes of this invention, the preferred radical of formula IX is the 2,2-bis(4-phenylene)propane radical, which is derived from bisphenol-A and in which Y is isopropylidene and A4 and A5 are each p-phenylene.

Various methods of preparing polycarbonate homopolymers are known. They include interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in U.S. Pat. Nos. 4,605,731 and 4,644,053.

A preferred polyhydric phenol is a dihydric phenol such as bisphenol A. Suitable polycarbonate resins for the practice of the present invention may be any commercial polycarbonate resin. The weight average molecular weight of suitable polycarbonate resins (as determined by gel permeation chromatography relative to polystyrene) may range from about 20,000 to about 500,000, preferably from about 40,000 to about 400,000. However, compositions in which polycarbonates have a molecular weight in the range of about 80,000 often have favorable properties.

It is also possible in the polymer mixture according to the invention to use a mixture of different polycarbonates as mentioned hereinbefore as an aromatic polycarbonate.

Use of Block Copolymers as a Compatibilizer

Generally a minimum of about 0.5 wt % of reactive block copolymer of the invention and preferably a range of from about 1 to about 7 will be sufficient to observe compatibilization effects on the engineering thermoplastic blend compositions in which used, such as improvements on mechanical properties. The block copolymer can also be used in amounts higher than the minimum but limited to a range so that it will positively affect the blend characteristics without substantially degrading other sought characteristics. Thus, typical blends will comprise the following: (a) thermoplastic having functional groups, 98-1 wt % (b) thermoplastic polymer miscible or compatible with the second block of the block copolymer, 1-98 wt %; and (c) reactive block copolymer, 1-20 wt %. Preferred blends of this invention comprise from about 40 to about 90 wt % thermoplastic having functional groups, 10-60 wt % thermoplastic miscible or compatible with the second block of the block copolymer and about 2 to about 5 wt % of the reactive block copolymer. This range of compositions will usually yield materials with improved impact properties and mechanical strength.

Generally, the blend compositions of the invention can be prepared by mixing the thermoplastic having functional groups, the thermoplastic miscible/compatible with one of the blocks of the copolymer and the reactive block copolymer of the invention, in any order and subjecting the mixture to temperatures sufficient to melt the mixture, for example, 180° C. and up. Such mixing and heating can be accomplished using conventional polymer processing equipment known in the art, such as batch mixers, single or multiple screw extruders, continuous kneaders, etc. Furthermore, the compatibilized compositions of the present invention may contain various additives, for example, stabilizers, flame retardants, antioxidants, fillers, processing aids and pigments in normal and conventional amounts, dependent upon the desired end-use. As examples of the fillers, there may be mentioned, e.g., metal oxides such as iron and nickel oxide, nonmetals such as carbon fiber, silicates (e.g. mica, aluminum silicate (clay)), titanium dioxide, glass flakes, glass beads, glass fibers, polymer fibers, etc. If used, the conventional additives and fillers are mechanically blended and the compositions of the invention are then molded in known methods.

Additional Applications for the Block Copolymer as a Compatibilizer

In a specific embodiment the thermoplastic polymer having functional groups is polycarbonate and the thermoplastic polymer miscible or compatible with the second block of the block copolymer is polystyrene.

In a specific embodiment the thermoplastic polymer having functional groups is polycarbonate and the thermoplastic polymer miscible or compatible with the second block of the block copolymer is high-impact polystyrene.

In a specific embodiment the thermoplastic polymer having functional groups is polycarbonate and the thermoplastic polymer miscible or compatible with the second block of the block copolymer is high-impact polystyrene, and in order to prepare the composition the functionalized block copolymer is melt blended first with a polycarbonate resin that has been previously hydrolyzed to increase the number of available functional groups. The product of this extrusion step is dried and then melt processed with more polycarbonate and high-impact polystyrene to prepare the final composition.

In a specific embodiment the thermoplastic polymer having functional groups is polycarbonate and the thermoplastic polymer miscible or compatible with the second block of the block copolymer is a copolymer of styrene, acrylonitrile and butadiene (ABS).

In a specific embodiment the thermoplastic polymer having functional groups is polycarbonate and the thermoplastic polymer miscible or compatible with the second block of the block copolymer is a copolymer of styrene, acrylonitrile and n-butyl acrylate.

In a specific embodiment the thermoplastic polymer having functional groups is polycarbonate and the thermoplastic polymer miscible or compatible with the second block of the block copolymer is a copolymer of styrene, acrylonitrile, butadiene and n-butyl acrylate.

In a specific embodiment the thermoplastic polymer having functional groups is polycarbonate and the thermoplastic polymer miscible or compatible with the second block of the block copolymer is a polyphenylene ether.

In a specific embodiment the thermoplastic polymer having functional groups is polycarbonate and the thermoplastic polymer miscible or compatible with the second block of the block copolymer is a mixture of high-impact polystyrene and polyphenylene ether.

In a specific embodiment the thermoplastic polymer having functional groups is polycarbonate and the thermoplastic polymer miscible or compatible with the second block of the block copolymer is a hydrogenated block copolymer of styrene and a diene monomer.

In a specific embodiment the thermoplastic polymer having functional groups is polycarbonate and the reactive block copolymer comprises glycidyl methacrylate as the functionalized acrylic monomer and styrene as the vinyl monomer in the first and second block.

In a specific embodiment the thermoplastic polymer having functional groups is polycarbonate and the reactive block copolymer comprises glycidyl methacrylate as the functionalized acrylic monomer and styrene as the vinyl monomer in the first block. The vinyl monomers in second block are styrene and N-phenylmaleimide.

In a specific embodiment the thermoplastic polymer having functional groups is polycarbonate and the reactive block copolymer comprises glycidyl methacrylate as the functionalized acrylic monomer and styrene as the vinyl monomer in the first block. The vinyl monomers in second block are styrene, N-phenylmaleimide and methyl methacrylate.

In a specific embodiment the thermoplastic polymer having functional groups is polycarbonate and the reactive block copolymer comprises glycidyl methacrylate as the functionalized acrylic monomer and styrene as the vinyl monomer in the first block. The vinyl monomers in second block are styrene, methyl methacrylate and butyl acrylate.

In a specific embodiment the thermoplastic polymer having functional groups is selected from a group consisting of polybutylene terephtalate, polyethylene terephtalate and mixtures thereof and the thermoplastic polymer miscible or compatible with the second block of the block copolymer is a block copolymer of styrene and a diene monomer.

In a specific embodiment the thermoplastic polymer having functional groups is selected from a group consisting of polybutylene terephtalate, polyethylene terephtalate and mixtures thereof and the thermoplastic polymer miscible or compatible with the second block of the block copolymer is a hydrogenated block copolymer of styrene and a diene monomer.

In a specific embodiment the thermoplastic polymer having functional groups is selected from a group consisting of polybutylene terephtalate, polyethylene terephtalate and mixtures thereof and the thermoplastic polymer miscible or compatible with the second block of the block copolymer is a styrene acrylic copolymer.

In a specific embodiment the thermoplastic polymer having functional groups is selected from a group consisting of polybutylene terephtalate, polyethylene terephtalate and mixtures thereof and the thermoplastic polymer miscible or compatible with the second block of the block copolymer is polystyrene.

In a specific embodiment the thermoplastic polymer having functional groups is selected from a group consisting of polybutylene terephtalate, polyethylene terephtalate and mixtures thereof and the thermoplastic polymer miscible or compatible with the second block of the block copolymer is high-impact polystyrene.

In a specific embodiment the thermoplastic polymer having functional groups is selected from a group consisting of polybutylene terephtalate, polyethylene terephtalate and mixtures thereof and the thermoplastic polymer miscible or compatible with the second block of the block copolymer is a copolymer of styrene, acrylonitrile and butadiene.

In a specific embodiment the thermoplastic polymer having functional groups is selected from a group consisting of polybutylene terephtalate, polyethylene terephtalate and mixtures thereof and the thermoplastic polymer miscible or compatible with the second block of the block copolymer is a copolymer of styrene, acrylonitrile and n-butyl acrylate.

In a specific embodiment the thermoplastic polymer having functional groups is selected from a group consisting of polybutylene terephtalate, polyethylene terephtalate and mixtures thereof and the thermoplastic polymer miscible or compatible with the second block of the block copolymer is a copolymer of styrene, acrylonitrile, butadiene and n-butyl acrylate.

In a specific embodiment the thermoplastic polymer having functional groups is selected from a group consisting of polybutylene terephtalate, polyethylene terephtalate and mixtures thereof and the reactive block copolymer comprises glycidyl methacrylate as the functionalized acrylic monomer and styrene as the vinyl monomer in the first and second block.

In a specific embodiment the thermoplastic polymer having functional groups is selected from a group consisting of polybutylene terephtalate, polyethylene terephtalate and mixtures thereof and the reactive block copolymer comprises glycidyl methacrylate as the functionalized acrylic monomer and styrene as the vinyl monomer in the first block. The vinyl monomers in second block are styrene and N-phenylmaleimide.

In a specific embodiment the thermoplastic polymer having functional groups is selected from a group consisting of polybutylene terephtalate, polyethylene terephtalate and mixtures thereof and the reactive block copolymer comprises glycidyl methacrylate as the functionalized acrylic monomer and styrene as the vinyl monomer in the first block. The vinyl monomers in second block are styrene, N-phenylmaleimide and methyl methacrylate.

In a specific embodiment the thermoplastic polymer having functional groups is selected from a group consisting of polybutylene terephtalate, polyethylene terephtalate and mixtures thereof and the reactive block copolymer comprises glycidyl methacrylate as the functionalized acrylic monomer and styrene as the vinyl monomer in the first block. The vinyl monomers in second block are styrene, methyl methacrylate and butyl acrylate.

In a specific embodiment the thermoplastic polymer having functional groups is selected from a group consisting of polypentamethylene carboxamide, polyhexamethylene adipamide and mixtures thereof and the thermoplastic polymer miscible or compatible with the second block of the block copolymer is polystyrene.

In a specific embodiment the thermoplastic polymer having functional groups is selected from a group consisting of polypentamethylene carboxamide, polyhexamethylene adipamide and mixtures thereof and the thermoplastic polymer miscible or compatible with the second block of the block copolymer is high-impact polystyrene.

In a specific embodiment the thermoplastic polymer having functional groups is selected from a group consisting of polypentamethylene carboxamide, polyhexamethylene adipamide and mixtures thereof and the thermoplastic polymer miscible or compatible with the second block of the block copolymer is a copolymer of styrene, acrylonitrile and butadiene.

In a specific embodiment the thermoplastic polymer having functional groups is selected from a group consisting of polypentamethylene carboxamide, polyhexamethylene adipamide and mixtures thereof and the thermoplastic polymer miscible or compatible with the second block of the block copolymer is a copolymer of styrene, acrylonitrile and n-butyl acrylate.

In a specific embodiment the thermoplastic polymer having functional groups is selected from a group consisting of polypentamethylene carboxamide, polyhexamethylene adipamide and mixtures thereof and the thermoplastic polymer miscible or compatible with the second block of the block copolymer is a copolymer of styrene, acrylonitrile, butadiene and n-butyl acrylate.

In a specific embodiment the thermoplastic polymer having functional groups is selected from a group consisting of polypentamethylene carboxamide, polyhexamethylene adipamide and mixtures thereof and the thermoplastic polymer miscible or compatible with the second block of the block copolymer is a polyphenylene ether.

In a specific embodiment the thermoplastic polymer having functional groups is selected from a group consisting of polypentamethylene carboxamide, polyhexamethylene adipamide and mixtures thereof and the thermoplastic polymer miscible or compatible with the second block of the block copolymer is a mixture of high-impact polystyrene and polyphenylene ether.

In a specific embodiment the thermoplastic polymer having functional groups is selected from a group consisting of polypentamethylene carboxamide, polyhexamethylene adipamide and mixtures thereof and the thermoplastic polymer miscible or compatible with the second block of the block copolymer is a hydrogenated block copolymer of styrene and a diene monomer.

Blend Compositions

Generally a minimum of about 0.5 wt. % of reactive block copolymer of the invention and preferably a range of from about 1 to about 7 wt. % will be sufficient to observe compatibilization effects on the thermoplastic blend compositions in which used, such as improvements on mechanical properties. The block copolymer can also be used in amounts higher than the minimum but limited to a range so that it will positively affect the blend characteristics without substantially degrading other sought characteristics. Thus typical blends will comprise the following: (a) thermoplastic polymer having functional groups, 98-1 wt % (b) thermoplastic polymer miscible or compatible with the second block of the block copolymer, 1-98 wt %; and (c) reactive block copolymer, 1-20 wt %. Preferred blends of this invention comprise from about 40 to about 90 wt % thermoplastic polymers having functional groups, 10-60 wt % thermoplastic polymers miscible or compatible with polystyrene and about 2 to about 5 wt % of the reactive block copolymer. This range of compositions will usually yield materials with improved impact properties and mechanical strength.

Generally, the blend compositions of the invention can be prepared by mixing the thermoplastic polymer having functional groups, the thermoplastic miscible/compatible with the second block of the block copolymer and the reactive block copolymer of the invention, in any order and subjecting the mixture to temperatures sufficient to melt the mixture, for example, 180° C. and up. Such mixing and heating can be accomplished using conventional polymer processing equipment known in the art, such as batch mixers, single or multiple screw extruders, continuous kneaders, etc. Furthermore the compatibilized compositions of the present invention may contain various additives, for example, stabilizers, flame retardants, anti-oxidants, fillers, processing aids and pigments in normal and conventional amounts, dependent upon the desired end-use. As examples of the fillers, there may be mentioned, e.g., metal <oxides such as iron and nickel oxide, nonmetals such as carbon fiber, silicates (e.g. mica, aluminum silicate (clay)), titanium dioxide, glass flakes, glass beads, glass fibers, polymer fibers, etc. If used, the conventional additives and fillers are mechanically blended and the compositions of the invention are then molded in known methods.

Tie Layer

The functional block copolymers can also be used as compatibilizers for thermoplastic polymers as a tie layer material for adhesively bonding plastic film layers one to another to form a laminate structure thereof. The usual process for using tie layers involves extruding two plastic layers and a tie layer, wherein the tie layer is located in between the two plastic layers.

Use with Clays

A mixture of the functional block copolymers and clay can be used to incorporate and effectively disperse clays into thermoplastic polymers. Thermoplastic polymers include those which may be described as hydrogenated or partially hydrogenated homopolymers, and random, tapered, or block polymers (copolymers, including terpolymers, tetrapolymers, etc.) of conjugated dienes and/or monovinyl aromatic compounds. The conjugated dienes include isoprene, butadiene, 2,3-dimethylbutadiene and/or mixtures thereof, such as isoprene and butadiene. The monovinyl aromatic compounds include any of the following and mixtures thereof: monovinyl monoaromatic compounds, such as styrene or alkylated styrenes substituted at the alpha-carbon atoms of the styrene, such as alpha-methylstyrene, or at ring carbons, such as o-, m-, p-methylstyrene, ethylstyrene, propylstyrene, isopropylstyrene, butylstyrene, isobutylstyrene, tert-butylstyrene (e.g., p-tertbutylstyrene). Also included are vinylxylenes, methylethyl styrenes, and ethylvinylstyrenes. Specific examples include random polymers of butadiene and/or isoprene and polymers of isoprene and/or butadiene and styrene and also estero-specific polymers such as syndiotactic polystyrene. Typical block copolymers include polystyrene-polyisoprene, polystyrene-polybutadiene, polystyrene-polybutadiene-polystyrene, polystyrene-ethylene butylene-polystyrene, polyvinyl cyclohexane-hydrogenated polyisoprene, and polyvinyl cyclohexane-hydrogenated polybutadiene. Tapered polymers include those of the previous monomers prepared by methods known in the art. Other non-styrenic polymers miscible or compatible with the second block of the copolymer include, but are not limited to, polyphenylene ether (PPE), polyvinyl methyl ether and tetramethyl polycarbonate, methyl methacrylate, alkyl substituted acrylates, alkyl substituted methacrylates and their copolymers with styrene. It also comprises polyolefins, where the term polyolefin is defined as a polymer the majority of whose monomers are olefins and may be polyethylene, polypropylene or co-polymers of ethylene and either propylene or vinyl acetate. It also comprises engineering thermoplastic such as: aliphatic and aromatic polycarbonates (such as bisphenol A polycarbonate), polyesters (such as poly(butylene terephthalate) and poly(ethylene terephthalate)), polyamides, polyacetal, polyphenylene ether or mixtures thereof. All these engineering thermoplastics are prepared according to well known commercial processes. Reference to such processes can be found in technical publications such as Encyclopedia of Polymer Science and Engineering, John Wiley and Sons., 1988, under the respective engineering thermoplastic polymer topic heading.

A mixture of the functional block copolymers and clay can be used to incorporate and effectively disperse clays into functional polymers. Functional polymers include but are not restricted to aliphatic and aromatic polycarbonates (such as bisphenol A polycarbonate), polyesters (such as poly(butylene terephthalate) and poly(ethylene terephthalate)), polyamides, polyacetal, polyphenylene ether, polyolefins having epoxy, anhydride or acid functionalities, polysulfones, polurethanes and mixtures thereof.

A mixture of the functional block copolymers, clay and a functionalized polyolefin can be used to incorporate and effectively disperse clays into nonfunctional polyolefins and improve their mechanical properties.

EXAMPLES

The following examples illustrate a number of aspects of the present invention. A wide variety of properties can be obtained in different blends by merely changing the molecular weight of the block of the compatibilizer, the amount of reactive monomers and the conversion of the first block. The following examples illustrate the invention in more detail, but they should not to be construed as limiting the present invention to the particular examples provided. The scope of the invention is properly determined by the claims that are ultimately under consideration.

Preparation of Diblock Copolymers

Reagents: Glycidyl methacrylate from Dow Quimica Mexicana, S. A. de C. V.; BPO from Akzo Nobel; 4-hydroxy tempo from CIBA; N-Phenylmaleimide, Methyl methacrylate, Butyl methacrylate and Butyl acrylate were acquired from Sigma-Aldrich. 4-hydroxy-2,2,6,6-tetramethylpiperidin-1-oxyl(4-hydroxy-TEMPO) from CIBA. These reagents were used as received. Styrene from Quimir was either used as received (examples 1, 7-9, 14-17) or washed with a NaOH solution in order to remove the inhibitor and dried with anhydrous sodium sulfate.

Examples 2-6, 8, 10-14. General procedure (see table 1 for the amount of reagents in each example). Styrene (St), glycidyl methacrylate (GMA), nitroxide and initiator (benzoyl peroxide, BPO) were placed in a double-jacket glass reactor and oxygen was removed with nitrogen bubbling for 3 minutes. Oil preheated to 131° C. was circulated through the outside jacket, and the mixture was stirred at 145 rpm. After the desired conversion was reached, heating was suspended and additional styrene and optional monomers (see table 2) were added to the reactor with stirring. After 3 min. of stirring, the reaction was either continued in the glass reactor until 10-20% more conversion was reached or directly poured into a second reactor. Nitrogen was bubbled through, and the reactor was immersed in an oil bath, which was previously heated to 125-130° C., for 18-24 hours to reach the desired conversion.

Examples 1, 7, 9. Styrene (St), glycidyl methacrylate (GMA), nitroxide and initiator (benzoyl peroxide, BPO) were added to a 20 liter double-jacket stainless steel reactor, and oxygen was removed by pressurizing the reactor with nitrogen (to 6 Kg/cm$^2$) and releasing the pressure three times. Preheated oil was circulated through the outside jacket until a temperature of 127-129° C. was reached, and stirring was started (60-80 rpm). After the desired conversion was achieved, heating was suspended and additional styrene and optional monomers (see table 2) were added to the reactor with stirring. After 1-3 min. of stirring, the reaction product was directly poured into a slab mold reactor. Nitrogen was bubbled through the reaction product, and oil was circulated through the slab mold reactor double jacket in order to maintain an internal temperature of 127-129° C. Heating was continued until a desired conversion was reached. The product was released from the slab mold reactor and ground to obtain a diblock copolymer in the form of granules.

TABLE 1

Diblock copolymers. First step composition

| Example number | St (mmol) | GMA (mmol) | GMA (% mol)$^a$ | Nitroxide (mmol) | BPO (mmol) | Conversion (%) |
|---|---|---|---|---|---|---|
| 1 | 179.86 | 35.88 | 16.6 | 0.56 | 0.43 | 70.00 |
| 2 | 179.88 | 35.72 | 16.5 | 0.56 | 0.43 | 70.00 |
| 3 | 214.32 | 8.91 | 4.0 | 0.62 | 0.48 | 85.20 |
| 4 | 293.71 | 58.86 | 16.3 | 4.31 | 3.32 | 89.58 |
| 5 | 200.78 | 4.15 | 2.0 | 0.86 | 0.66 | 80.76 |
| 6 | 530.58 | 47.28 | 8.1 | 2.48 | 1.91 | 85.00 |
| 7 | 265.90 | 52.78 | 16.5 | 0.83 | 0.64 | 82.90 |
| 8 | 266.24 | 52.86 | 16.5 | 0.83 | 0.64 | 70.00 |
| 9 | 163.99 | 36.43 | 18.1 | 0.72 | 0.55 | 70.00 |
| 10 | 190.20 | 27.94 | 12.7 | 0.70 | 0.54 | 78.18 |
| 11 | 211.25 | 41.97 | 16.5 | 0.66 | 0.51 | 76.07 |
| 12 | 205.03 | 40.74 | 16.5 | 0.64 | 0.49 | 76.07 |
| 13 | 474.19 | 94.10 | 16.5 | 1.50 | 1.15 | 66.40 |
| 14 | 460.76 | 91.48 | 16.5 | 1.44 | 1.11 | 70.00 |

$^a$Considering the initial GMA to St ratio

NOTE:
table 1 shows amounts calculated for the synthesis of 100 g of the diblock, while actual amounts ware scaled up or down, depending on the size of the reactors used for each case.

TABLE 2

Diblock copolymers. Second step composition

| Example number | St (mmol) | Butyl Acrylate (mmol) | Butyl Methacrylate (mmol) | N-phenyl maleimide (mmol) | Conversion | TOTAL GMA (% mol)$^b$ |
|---|---|---|---|---|---|---|
| 1 | 729.52 | 0.00 | 0.00 | 0.00 | 99 | 3.8 |
| 2 | 730.57 | 0.00 | 0.00 | 0.00 | 99 | 3.8 |
| 3 | 731.68 | 0.00 | 0.00 | 0.00 | 99 | 0.9 |
| 4 | 572.32 | 0.00 | 0.00 | 0.00 | 99 | 6.3 |
| 5 | 750.95 | 0.00 | 0.00 | 0.00 | 99 | 0.4 |
| 6 | 357.11 | 0.00 | 0.00 | 0.00 | 99 | 5.0 |
| 7 | 619.55 | 0.00 | 0.00 | 0.00 | 99 | 5.6 |
| 8 | 620.38 | 0.00 | 0.00 | 0.00 | 99 | 5.6 |
| 9 | 745.24 | 0.00 | 0.00 | 0.00 | 97 | 3.8 |
| 10 | 547.99 | 148.43 | 0.00 | 0.00 | 97 | 3.1 |
| 11 | 421.99 | 217.38 | 0.00 | 0.00 | 98 | 4.7 |

TABLE 2-continued

Diblock copolymers. Second step composition

| Ex- ample num- ber | SECOND STEP | | | | | |
|---|---|---|---|---|---|---|
| | St (mmol) | Butyl Acrylate (mmol) | Butyl Methacrylate (mmol) | N-phenyl maleimide (mmol) | Con- version | TOTAL GMA (% mol)[b] |
| 12 | 409.55 | 0.00 | 210.89 | 0.00 | 97 | 4.7 |
| 13 | 292.73 | 0.00 | 0.00 | 36.09 | 92 | 10.5 |
| 14 | 284.62 | 0.00 | 0.00 | 52.64 | 92 | 10.3 |

[b]Considering the total GMA to monomers (1st and second step) ratio
NOTE:
table 2 shows amounts calculated for the synthesis of 100 g of the diblock, while actual amounts ware scaled up or down, depending on the size of the reactors used for each case.

Molecular weight distributions relative to polystyrene were determined through GPC (ASTM D3536-91) using a Waters 410, RI detector, THF eluent, 1.0 mL/min, at 40° C.; Styragel linear columns HR 4 and HR 3. Results are shown in table 3.

TABLE 3

Properties of diblock copolymers.

| Diblock copolymer example number | FIRST STEP | | | TOTAL | | |
|---|---|---|---|---|---|---|
| | Mn | Mw | PDI | Mn | Mw | PDI |
| 1 | 20212 | 22546 | 1.12 | 92618 | 142527 | 1.54 |
| 2 | 24068 | 29870 | 1.24 | 64771 | 109887 | 1.70 |
| 3 | 27682 | 30585 | 1.10 | 92060 | 138132 | 1.50 |
| 4 | 7826 | 8857 | 1.13 | 16994 | 20353 | 1.20 |
| 5 | 15269 | 16837 | 1.10 | 50648 | 76101 | 1.50 |
| 6 | 15965 | 17994 | 1.13 | 25329 | 30624 | 1.21 |
| 7 | 27526 | 32698 | 1.19 | 49768 | 74509 | 1.50 |
| 8 | 32331 | 38528 | 1.19 | 65338 | 96507 | 1.48 |
| 9 | 24144 | 27555 | 1.14 | 67697 | 105233 | 1.55 |
| 10 | 23490 | 30595 | 1.30 | 70528 | 153445 | 2.18 |
| 11 | 20813 | 25741 | 1.24 | 61006 | 125348 | 2.05 |
| 12 | 20813 | 25741 | 1.24 | 50622 | 91606 | 1.81 |
| 13 | 27569 | 34447 | 1.25 | 45396 | 74289 | 1.64 |
| 14 | 32331 | 38528 | 1.19 | 35273 | 66288 | 1.88 |

Residual Glycidyl methacrylate (GMA). In order to determine the amount of residual GMA, the reaction mixture of example 2 (first step, after 70% conversion was achieved), was analyzed using gas chromatography and the amount of GMA was determined using a calibration curve of GMA at a known concentration.

Table 4 shows calibration curve data used to determine GMA content: The standards contain a variable amount of GMA and a fixed amount of toluene as an internal standard, both dissolved in THF. The chromatogram is integrated and the relative areas are calculated (area of GMA peak/toluene area), a linear regression is used to correlate the relative peak area with GMA concentration (relative areas=0.4192*(GMA concentration)+0.1138; R2=0.9972). A sample of 100 mg of the reaction mixture of example 2 (first step, after 70% conversion) was dissolved in THF adding the same amount of toluene as an internal standard as the used in the standards.

TABLE 4

Gas chromatography calibration curve data used to determine the % w/w of GMA.

| GMA standards concentration (mg/mL) | Peak area (relative to the internal standard) |
|---|---|
| 0 | 0 |
| 1.0424 | 0.602686 |
| 5.212 | 2.59247 |
| 10.424 | 4.40227 |
| 15.636 | 6.273665 |
| 20.848 | 9.029951 |
| 26.06 | 11.10497 |

The mixture of example 2, first step, shows a chromatograph with a relative peak area of 2.203, which corresponds (using the linear regression equation) to a concentration of 4.984 mg/mL. Taking into account the amount of sample, this corresponds to 4.34% w/w GMA. Since this sample has 70% conversion, only 30% of the sample contains monomers, and the concentration of GMA in the monomers then equals 14.47% w/w (4.34 g GMA*100 g reaction mixture/30 g remaining monomer mixture).

Synthesis of reference materials. In order to compare the performance of diblocks prepared in examples 1-14, three random copolymers were prepared. General procedure (see table 5 for the amount of reagents in each example). Styrene (St), glycidyl methacrylate (GMA), nitroxide and initiator (benzoyl peroxide, BPO) were placed in a reactor, nitrogen was bubbled through the mixture, and the reactor was immersed in an oil bath, which was previously heated to 125-130° C., for 20-24 hours to reach the desired conversion.

TABLE 5

Synthesis of random copolymers.

| Example number | Composition analogous to example of table 1 number: | St (mmol) | GMA (mmol) | N-phenyl maleimide (mmol) | Nitroxide (mmol) | BPO (mmol) | Conversion (%) | GMA[a] (% mol) |
|---|---|---|---|---|---|---|---|---|
| 15 | 14 | 745.38 | 91.48 | 52.64 | 1.44 | 1.11 | 99.00 | 10.3 |
| 16 | 8 | 886.63 | 52.85 | 0.00 | 0.83 | 0.64 | 99.00 | 5.6 |
| 17 | 2 | 910.47 | 35.71 | 0.00 | 0.56 | 0.43 | 99.00 | 3.8 |

[a]Considering the total GMA to monomersratio
NOTE:
table 5 shows amounts calculated for the synthesis of 100 g of the diblock, while actual amounts ware scaled up or down, depending on the size of the reactors used for each case.

The amount of monomeric units in each block can be controlled with the first block conversion, the total conversion and the amount of initiator and controlling agent. The composition of each block can be controlled by the mole percent of monomers added during the first and second step. This can be better understood by looking at examples 1 to 11, where different total amounts of glycidyl methacrylate (example 4 has 6.3% mol of GMA whereas example 5 has 0.4% mol) and different molecular weights in both blocks (example 4 has a number average molecular weight (Mn) in the first block of 7826, whereas example 8 has an Mn of 32331; example 1 has a total Mn of 92618, whereas example 4 has a total Mn of 16994), depending on the initial composition of monomers, nitroxide and initiator, the amount of styrene added in the second step, the first block conversion and the total conversion. The total amount of functional acrylic monomer (GMA, in this case) can be controlled by the initial amount of GMA added, the first block conversion and the amount of monomers added in the second step. For example, examples 2, 7 and 11 have the same percent of GMA added in the first step (16.5% mol), but since the amount of styrene added in the second step is different, they have different total amounts of GMA. In examples containing GMA and styrene in the first step, since the reactivities of both monomers are similar, the initial mole percent of GMA added in the first step is similar (but lower) to the mole percent incorporated in the first block. For example 2, the amount of residual GMA in the residual monomers was quantified using gas chromatography (see description below table 3), obtaining 14.47% w/w, compared to the initial weight percent that is 21.33% w/w.

Another system, in which a reactive group is contained in both blocks, is the one consisting of glycidyl methacrylate and styrene in the first step, and N-phenyl maleimide and styrene in the second step (examples 13 and 14). In these examples, since N-phenyl maleimide tends to alternate, the copolymer will consist of a triblock, where the second block contains the N-phenyl maleimide and the third block will consist mainly of polystyrene.

Polymer Blends

Compatibilization of Polystyrene Acrylic Copolymer and PET Blends.

Examples 18-24. Raw materials: commercial random Poly (styrene-co-butyl acrylate) (66 mol percent Styrene) and bottle grade PET (I.V. 0.75-0.9 dL/g, measured in 60/40 phenol/dichlorobenzene at 25° C.).

Examples 18-24. Blending procedure.

Blends were prepared in a 90/10 weight ratio of PET pellet and the acrylic copolymer, according to table 6. For examples 51-56, the compatibilizer was added during processing. Samples were analyzed using a 100× magnification in an optical microscope for large particles and when particles were not observable at 100×, the morphology of the blends was determined using a Carl Zeiss EM910 120 kV transmission electron microscope after microtoming at room temperature. Sections were stained with vapors of $RuO_4$.

TABLE 6

Composition of Polystyrene acrylic copolymer/PET blends

| Blend. Example number | Diblock copolymer from table 1 | PET/Poly (styrene-co-butyl acrylate)/ diblock copolymer | | | PET (g) | Poly(styrene-co-butyl acrylate) (g) | Diblock co-polymer (g) |
|---|---|---|---|---|---|---|---|
| 18 | 1 | 90 | 10 | 5 | 51.4 | 5.7 | 2.9 |
| 19 | 7 | 90 | 10 | 5 | 51.4 | 5.7 | 2.9 |
| 20 | 9 | 90 | 10 | 5 | 51.4 | 5.7 | 2.9 |
| 21 | 10 | 90 | 10 | 5 | 51.4 | 5.7 | 2.9 |
| 22 | 11 | 90 | 10 | 5 | 51.4 | 5.7 | 2.9 |
| 23 | 12 | 90 | 10 | 5 | 51.4 | 5.7 | 2.9 |
| 24 | none | 90 | 10 | 0 | 54.0 | 6.0 | 0.0 |

TABLE 7

Microscopical analysis of blends 18-24.

| Blend. Example number | Particle size (μm) | |
|---|---|---|
| | Maximum | Average |
| 18 | 3.55 | 1.01 |
| 19 | 1.36 | 0.44 |
| 20 | 2.32 | 0.33 |
| 21 | 3.70 | 1.21 |
| 22 | 36.35 | 3.02 |
| 23 | 23.75 | 3.15 |
| 24 | 10.76 | 0.44 |

In experiments 18-24 the performance of different block copolymers is evaluated in terms of the reduction of particle size in polymer blends. Table 7 shows that most of the block copolymers effectively reduce the maximum particle size (with the exception of examples 22 and 23, whose bad performance can be attributed to mixing rheological problems caused by the low Tg of the copolymers that contain butyl acrylate or methacrylate). The performance of the block copolymers depends on a variety of variables such as the number of functional groups in each block, the molecular weight of each block and the composition (polarity). In the present invention these variables can be easily adjusted in order to obtain a variety of compatibilizers with different composition and molecular weights that can be tested in order to determine correlations between structure/composition and performance.

With reference to FIGS. 3, 4a and 4b, the TEM photographs of examples 20 and 24 show how the Poly(styrene-co-butyl acrylate (dark particles) is distributed in the PET matrix. In the case of example 24, the photographs shown in FIGS. 4a and 4b show a blend without compatibilizer consisting of a population of small particles (of less than 0.44 micrometers, μm) and a population of very large particles (around 10 micrometers). In the case of example 20, shown in FIG. 3, the addition of only 5% of a compatibilizer dramatically improves the Poly(styrene-co-butyl acrylate dispersion, yielding a more homogeneous distribution, with an average particle size of 0.33 μm and a maximum particle size of 2.32 μm.

Compatibilization of PET and Poly(styrene-co-methyl methacrylate) Blends.

Examples 25-34. Raw materials: Amorphous PET (Eastman plastic, EASTAR copolyester 6763 natural) and Poly (styrene-co-methyl methacrylate) (CET 115 from Resirene). PET was previously dried at a reduced pressure for 4 hours at 65° C.

Examples 25-34. Blending, general procedure: All components were physically mixed by dry blending in the proportions indicated in the following table (table 8), so as to produce 60 g of the mixture. The mixture was then mixed using a Haake Mixer at 60 rpm at 150° C. for 5 minutes after constant torque was reached. Samples were analyzed using a 100× magnification in an optical microscope for large particles and when particles were not observable at 100×, the morphology of the blends was determined using a Carl Zeiss EM910 120 kV transmission electron microscope after microtoming at 0° C. Sections were stained with vapors of $RuO_4$.

TABLE 8

PET/Poly(styrene-co-methyl methacrylate) blends composition

| Blend. Example number | Diblock copolymer from table 1 | PET/Poly (styrene-co-methyl methacrylate)/ diblock copolymer | | | PET (g) | Poly(styrene-co-methyl methacrylate) (g) | Diblock copolymer (g) |
|---|---|---|---|---|---|---|---|
| 25 | 1 | 80 | 20 | 3 | 46.6 | 11.7 | 1.7 |
| 26 | 3 | 80 | 20 | 3 | 46.6 | 11.7 | 1.7 |
| 27 | 4 | 80 | 20 | 3 | 46.6 | 11.7 | 1.7 |
| 28 | 5 | 80 | 20 | 3 | 46.6 | 11.7 | 1.7 |
| 29 | 6 | 80 | 20 | 3 | 46.6 | 11.7 | 1.7 |
| 30 | 6 | 80 | 20 | 0.5 | 47.8 | 11.9 | 0.3 |
| 31 | 6 | 80 | 20 | 5 | 45.7 | 11.4 | 2.9 |
| 32 | 7 | 80 | 20 | 3 | 46.6 | 11.7 | 1.7 |
| 33 | 9 | 80 | 20 | 3 | 46.6 | 11.7 | 1.7 |
| 34 | NONE | 80 | 20 | 0 | 48.0 | 12.0 | 0.0 |

TABLE 9

Microscopical analysis of blends 25-34

| Blend. Example number | Particle size (nm) | | |
|---|---|---|---|
| | Minimum | Maximum | Average |
| 25 | 224 | 1268 | 530 |
| 26 | 113 | 800 | 408 |
| 27 | 60 | 807 | 354 |
| 28 | 611 | 1845 | 1010 |
| 29 | 133 | 706 | 347 |
| 30 | 95 | 1265 | 462 |
| 31 | 91 | 2133 | 292 |
| 32 | 111 | 1070 | 464 |
| 33 | 326 | 1277 | 640 |
| 34 | 732 | 6168 | 1632 |

Figure 5:
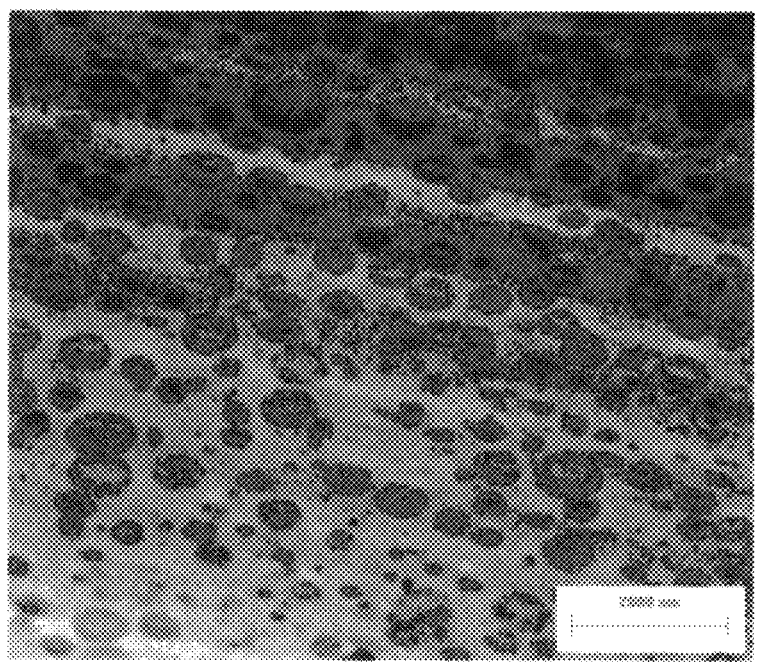
FIG. 5 is a photomicrograph of a blend composition according to the present invention.
Figure 6:
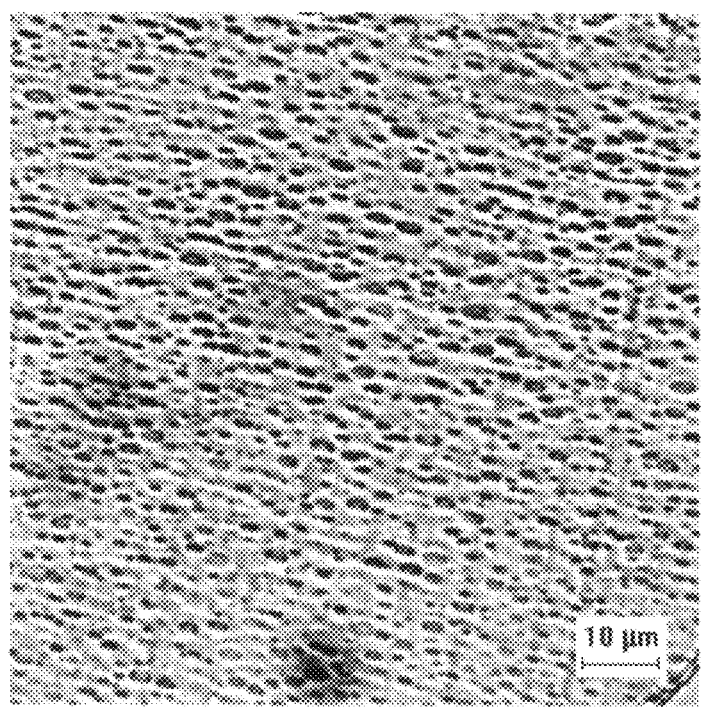
FIG. 6 is a photomicrograph of a prior art blend composition.

Examples 25-34 show the compatibilization of PET and a Poly(styrene-co-methyl methacrylate). In these examples the three statistical measurements of particle size considered (minimum, maximum and average) are effectively reduced by using different diblock copolymers (see table 9). Since blend 34, without a compatibilizer, contains large particles of poly(styrene-co-methyl methacrylate), this blend could be observed using an optical microscope. As can be seen in FIG. 6, the photomicrograph for blend 34 shows poly(styrene-co-methyl methacrylate) dispersed in PET, with average particle sizes of 1632 nm. In contrast, the TEM photograph of example 29, shown in FIG. 5, shows how a compatibilized blend has considerably smaller average particle sizes of 347 nm, and that even the largest particle (706 nm) is smaller than the minimum particle size obtained without a compatibilizer.

Compatibilization of Polyethylene Terephtalate and SEBS Blends.

Examples 35-40. Raw materials: recycled bottle grade PET (I.V. 0.8 dL/g, measured in 60/40 phenol/dichlorobenzene at 25° C.) dried for 2 h at 130° C. before use; SEBS CH-6170 and CH-6110 from Dynasol.

Examples 35-40. Blending, general procedure: All components were physically mixed by dry blending in the proportions indicated in the following table (table 10) so as to produce 2 Kg of the mixture. The mixture was extruded using a twin screw extruder ZSK-30 from Coperion and a profile temperature of: 248-270° C. The samples were cut into pellets and dried. The materials were injected at a temperature of 260-275° C. and a mould temperature of 65-70° C. The injected materials were evaluated according to ASTM D638 and ASTM D256 as shown in table 11

TABLE 10

Composition of PET/SEBS blends.

| Blend. Example number | Diblock copolymer from table 1 or table 5 | PET/ SEBS[a]/ Diblock | | | PET (g) | SEBS (g) | Diblock (g) |
|---|---|---|---|---|---|---|---|
| 35 | 16 | 75 | 20 | 5 | 1500.0 | 400.0 | 100.0 |
| 36 | 8 | 75 | 20 | 5 | 1500.0 | 400.0 | 100.0 |
| 37 | 16 | 80 | 15 | 5 | 1600.0 | 300.0 | 100.0 |
| 38 | 8 | 80 | 15 | 5 | 1600.0 | 300.0 | 100.0 |
| 39 | none | 70 | 30 | 0 | 1400.0 | 600.0 | 0.0 |
| 40 | none | 70 | 30 | 0 | 1400.0 | 600.0 | 0.0 |

[a]In all cases SEBS CH6170 was used with the only exception of example number 40, where SEBS CH6110 was used.

TABLE 11

Mechanical properties of examples 35-40

| Blend. Example number | Tensile Strength, Yield (Kpsi) ASTM D638 | Tensile Strain, Yield (%) ASTM D638 | Tensile Strength, Break (Kpsi) ASTM D638 | Tensile Strain, Break (%) ASTM D638 | Notched Izod Impact (0.125 in) lb-ft/in ASTM D256 |
|---|---|---|---|---|---|
| 35 | 4.58 | 4.78 | — | 0.00 | 11.27 |
| 36 | 4.65 | 4.81 | — | 0.00 | 13.71 |
| 37 | 5.17 | 4.79 | 2.57 | 134.42 | 1.63 |
| 38 | 5.28 | 4.90 | — | 0.00 | 11.35 |
| 39 | ND | ND | ND | ND | 1.34 |
| 40 | ND | ND | ND | ND | 0.89 |

ND: Not determined

The compatibilization of PET and SEBS shown in examples 35-40 is achieved using different reactive block copolymers. In these examples a random copolymer with the same composition (examples 35 and 37, containing polymer 16) is also included for comparison purposes. The mechanical properties of these blends show that the reactive diblock copolymer 8 has superior properties compared with the random copolymer in analogous compositions (Table 11, blend 35 vs 36 and blend 37 vs 38). When the notched Izod impact of these blends is compared, superior impacts are obtained with the block copolymer 8, compared with the random copolymer 16 (blend 35 vs 36 and blend 37 vs 38). The blend without compatibilizer was evaluated using even more SEBS (30% SEBS) to emphasize that even with high amounts of impact modifier, the blend has very poor impact properties.

Examples 35-40 show how the block copolymers of the present invention can effectively modify the impact properties of recycled PET by making it compatible with SEBS.

Compatibilization of Polycarbonate and Acrylonitrile-butadiene-styrene (PC/ABS) Blends Examples 41-53. Raw materials: Polycarbonate Lexan 121 was acquired from General Electric and Terluran GP35 (ABS) from BASF. Materials were dried for 4 hours before use.

Examples 41-53. Blending, general procedure. All components were physically mixed by dry blending in the proportions indicated in the following table (table 12) so as to produce 2 Kg of the mixture. The mixture was extruded using a twin screw extruder ZSK-30 from Coperion and a profile temperature of: 248-270° C. The samples were cut into pellets and dried. The materials were injected at a temperature of 265-275° C. and a mould temperature of 45° C. The injected materials were evaluated according to ASTM D638 and ASTM D256 as shown in table 13.

Example 48 was analyzed using a 100× magnification in an optical microscope. As shown in FIG. 7, a photomicrograph of blend 48 shows a co continuous morphology. In contrast, for the compatibilized blend of example 53, shown in FIGS. 8a and 8b, observed particles at 100× were smaller and had to be further analyzed with TEM (Jeol 200 KV), after microtoming at 0° C. and staining with vapors of $RuO_4$ (ABS is shown in dark in the photograph). The photomicrograph of example 53, FIGS. 8a and 8b, shows a dramatic improvement in particle size of ABS dispersed in PET, compared to the blend without compatibilizer. The average particle size is of 0.867 micrometers.

TABLE 12

PC/ABS blends composition

| Blend. Example number | Diblock copolymer from table 1 or table 5 | PC/ ABS/ Diblock | | PC (g) | ABS (g) | Diblock (g) |
|---|---|---|---|---|---|---|
| 41 | none | 50 | 50 | 0 | 1000.0 | 1000.0 | 0.0 |
| 42 | 13 | 50 | 50 | 5 | 952.4 | 952.4 | 95.2 |
| 43 | 14 | 50 | 50 | 5 | 952.4 | 952.4 | 95.2 |
| 44 | none | 60 | 40 | 0 | 1200.0 | 800.0 | 0.0 |
| 45 | 15 | 60 | 40 | 3 | 1165.0 | 776.7 | 58.3 |
| 46 | 14 | 50 | 50 | 3 | 970.9 | 970.9 | 58.3 |
| 47 | 14 | 60 | 40 | 3 | 1165.0 | 776.7 | 58.3 |
| 48 | none | 70 | 30 | 0 | 1400.0 | 600.0 | 0.0 |
| 49 | 14 | 70 | 30 | 5 | 1333.3 | 571.4 | 95.2 |
| 50 | 13 | 60 | 40 | 5 | 1142.9 | 761.9 | 95.2 |
| 51 | 14 | 60 | 40 | 5 | 1142.9 | 761.9 | 95.2 |
| 52 | 13 | 70 | 30 | 5 | 1333.3 | 571.4 | 95.2 |
| 53 | 14 | 70 | 30 | 3 | 1359.2 | 582.5 | 58.3 |

TABLE 13

Mechanical properties of examples 41-53

| Blend. Example number | Tensile Strength, Yield (Kpsi) ASTM D638 | Tensile Strain, Yield (%) ASTM D638 | Tensile Strain, Break (%) ASTM D638 | Tensile Modulus (Kpsi) ASTM D638 | Notched Izod Impact (0.125 in) lb-ft/in ASTM D256 |
|---|---|---|---|---|---|
| 41 | 6.75 | 2.99 | 2.82 | 334.13 | 0.29 |
| 42 | 7.02 | 4.31 | 18.05 | 358.72 | 0.81 |
| 43 | 7.14 | 4.62 | 16.38 | 348.26 | 1.01 |
| 44 | 7.46 | 4.52 | 6.78 | 343.35 | 1.13 |
| 45 | 7.46 | 4.79 | 19.49 | 333.00 | 1.53 |
| 46 | 7.06 | 4.34 | 20.92 | 346.84 | 3.04 |
| 47 | 7.66 | 4.95 | 21.68 | 346.05 | 4.27 |
| 48 | 7.96 | 5.03 | 12.88 | 338.14 | 4.44 |
| 49 | 8.16 | 5.23 | 17.78 | 349.01 | 4.87 |
| 50 | 7.61 | 5.00 | 21.00 | 340.34 | 5.12 |
| 51 | 7.59 | 4.91 | 19.09 | 350.98 | 5.44 |
| 52 | 8.13 | 5.17 | 16.77 | 349.73 | 5.47 |
| 53 | 8.12 | 5.28 | 22.25 | 344.56 | 6.27 |

Table 13 shows the mechanical properties and notched Izod Impact of PC/ABS blends using: i) Different proportions of PC to ABS, ii) different compatibilizers iii) a random copolymer with analogous molecular weight and composition than the evaluated block copolymer. The better performance of the block copolymer (Table 13, example 47 using diblock of example 14) compared to the random copolymer (example 45 using random block copolymer of example 15) is revealed in all the mechanical properties of the blend and is more dramatically observed in the Notched Izod impact value. In fact, the impact obtained with the random copolymer (1.53 lb-ft/in, example 45) is similar to the one obtained without a compatibilizer (1.13 lb-ft/in, example 44) and is lower than the one obtained with the diblock copolymer (4.27 lb-ft/in, example 47). Better impact properties are obtained for blends containing more polycarbonate, obtaining 6.24 lb-ft/in for the compatibilized blend with 3% wt compatibilizer against 4.44 lb-ft/in of the blend without compatibilizer.

Examples 41-53 show how the block copolymers of the present invention can improve impact properties of polycarbonate by making it more compatible with ABS.

Compatibilization of Polycarbonate and High-Impact Polystyrene Blends

Examples 54-56. Raw materials: Polycarbonate (PC) Lexan 121 and 141 was acquired from General Electric; High-impact polystyrene (HIPS) containing 40 rubber was obtained as a special grade from Resirene; Flow additive Joncryl ADP 1200 from Johnson Polymers and the antioxidant U-626 from Crompton. Polymers were dried before use.

Examples 54-56. Blending, general procedure. All components were physically mixed by dry blending in the proportions indicated in the following table (table 14). The mixture was extruded using a twin screw extruder (ZSK-30 from Coperion) and a profile temperature of: 255-270° C. The samples were cut into pellets and dried. The materials were injected at a temperature of 265-275° C. into a mould at a temperature of 45° C. The notched Izod Impact of the injected materials was evaluated according to ASTM D256 as shown in table 14.

TABLE 14

PC/HIPS blends composition and Izod impact.

| Blend. Example number | Diblock copolymer from table 1 or table 5 | Lexan 121/Lexan 141/ HIPS 40/Diblock copolymer | | | | Lexan 121 (g) | Lexan 141 (g) | HIPS 40 (g) | Diblock copolymer (g) | Notched Izod Impact (0.125 in) lb-ft/in ASTM D256 |
|---|---|---|---|---|---|---|---|---|---|---|
| 54 | none | 47.50 | 20.5 | 32.00 |   | 712.50 | 307.50 | 480.00 | 0.00 | 3.6 |
| 55 | 16 | 47.50 | 20.5 | 32.00 | 3 | 712.50 | 307.50 | 480.00 | 45.00 | 4.6 |
| 56 | 2 | 47.50 | 20.5 | 32.00 | 3 | 712.50 | 307.50 | 480.00 | 45.00 | 6.1 |

The notched Izod impact properties of PC/HIPS blends is evaluated in examples 54-56 using block copolymer 2 (see table 1), the random copolymer 16 (see table 5) and no compatibilizer. The results reveal that the block copolymer has a better performance than achieved using the random copolymer as a compatibilizer and of course better than the blend without a compatibilizer.

Examples 54-56 show how the block copolymers of the present invention can improve impact properties of polycarbonate by making it more compatible with high-impact polystyrene.

Having described the invention above, various modifications of the techniques, procedures, materials, and equipment will be apparent to those skilled in the art. It is intended that all such variations within the scope and spirit of the invention be included within the scope of the appended claims or within the scope of claims subsequently made to the invention.

What is claimed is:

1. A process for making a block copolymer, comprising:
    a) reacting an acrylic monomer (selected from the group consisting of glycidyl methacrylate, 2-hydroxyethyl methacrylate, 2-dimethylaminoethyl methacrylate and 2-diethylaminoethyl methacrylate), one or more vinyl monomers, a free radical initiator and a stable free radical to form a reaction product that includes a first block and residual unreacted acrylic monomer; and
    b) reacting one or more vinyl monomers with the reaction product from the first step to form a second block that includes the residual unreacted acrylic monomer.

2. The process of claim 1, wherein the block copolymer has a number average molecular weight between about 25,000 and about 350,000.

* * * * *